(12) United States Patent
Oohashi et al.

(10) Patent No.: US 7,686,116 B2
(45) Date of Patent: Mar. 30, 2010

(54) VEHICLE

(75) Inventors: Satoshi Oohashi, Shizuoka (JP); Kiyoshi Shimada, Shizuoka (JP); Naoyuki Hosono, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 160 days.

(21) Appl. No.: 11/875,808

(22) Filed: Oct. 19, 2007

(65) Prior Publication Data
US 2008/0156566 A1 Jul. 3, 2008

(30) Foreign Application Priority Data
Dec. 27, 2006 (JP) ............................. 2006-350770
Apr. 27, 2007 (JP) ............................. 2007-118439

(51) Int. Cl.
*B62K 11/00* (2006.01)
(52) U.S. Cl. ...................... 180/219; 180/229; 180/68.1
(58) Field of Classification Search ................. 180/219, 180/229, 68.1
See application file for complete search history.

(56) References Cited

U.S. PATENT DOCUMENTS

| | | | | |
|---|---|---|---|---|
| 4,019,595 A | * | 4/1977 | Imai et al. .................... | 180/229 |
| 4,478,306 A | * | 10/1984 | Tagami ........................ | 180/229 |
| 5,211,255 A | * | 5/1993 | Fukuda ........................ | 180/219 |
| 5,715,904 A | * | 2/1998 | Takahashi et al. ........... | 180/229 |
| 5,984,035 A | * | 11/1999 | Katoh et al. ................. | 180/68.1 |
| D461,157 S | * | 8/2002 | Myers et al. ................. | D12/216 |
| 6,651,769 B2 | * | 11/2003 | Laivins et al. ................ | 180/229 |
| 7,140,329 B2 | * | 11/2006 | Ohzono et al. .............. | 123/41.1 |
| 7,243,750 B2 | * | 7/2007 | Nakabayashi et al. ...... | 180/68.1 |
| 2006/0054372 A1 | * | 3/2006 | Ohzono et al. .............. | 180/229 |
| 2006/0175112 A1 | * | 8/2006 | Yoshida et al. .............. | 180/229 |
| 2007/0107967 A1 | * | 5/2007 | Satake ......................... | 180/218 |

FOREIGN PATENT DOCUMENTS

JP 9-240549 A2 9/1997

* cited by examiner

*Primary Examiner*—Lesley Morris
*Assistant Examiner*—Marlon A Arce
(74) *Attorney, Agent, or Firm*—Dickstein Shapiro LLP

(57) ABSTRACT

A vehicle including a radiator with improved cooling efficiency is disclosed. The vehicle, such as a motorcycle, comprises an engine 10, a radiator 13b (13c) for cooling of the engine 10, and a baffle device 14 (15) including an outer wall portion 14a (15a) extending toward an outer side 131 (13n) of the radiator 13b (13c) from the front, and an upper wall portion 14b (15b) extending toward an upper portion 13d (13f) of the radiator 13b (13c) from the front and arranged in a manner not to have any substantial gap between it and the upper portion 13d (13f) of the radiator 13b (13c).

25 Claims, 24 Drawing Sheets

VEHICLE

TECHNICAL FIELD

The present invention relates to a vehicle, and more particularly, to a vehicle provided with a radiator.

BACKGROUND ART

Conventionally, there are known motorcycles (vehicles) provided with a radiator (see, for example, Japanese Patent Specification No. 3801254). The Japanese patent specification discloses a cooling device of a motorcycle, which includes a radiator and a radiator shroud (baffle device). With the motorcycle, both left and right side portions of the radiator shroud are constructed to cover left and right sides of the radiator with predetermined clearances or gaps therebetween. Also, an upper portion of the radiator shroud is positioned in a region above the radiator with a predetermined clearance from an upper surface of the radiator. That is, the upper portion of the radiator shroud is arranged in a state, in which a space is defined above the radiator.

With the construction described in Japanese Patent Specification 3801254, however, since the upper portion of the radiator shroud (baffle device) is arranged in a state, in which a space is defined above the radiator, there is a disadvantage that air received from the front by the radiator shroud is liable to pass through the space above the radiator. Therefore, since a portion of the air received from the front by the radiator shroud does not enter a core portion of the radiator, there is caused a problem that it is difficult to improve the cooling efficiency of the radiator.

SUMMARY

The invention has been thought of in order to solve the foregoing problem. One of its objects is to provide a vehicle with improved radiator cooling efficiency.

In one aspect of the invention, there is provided a vehicle comprising an engine, a radiator including one side end and the other side end, which are spaced from each other in a vehicle width direction, and a core portion disposed between the one side end and the other side end, through which cooling water for cooling of the engine passes, and a baffle device including an outer wall portion extending toward the one side end of the radiator from the front and an upper wall portion extending toward an upper end of the radiator from the front and arranged in a manner not to have any substantial gap between it and the upper end of the radiator.

With the vehicle in the one aspect, by providing a baffle device including an outer wall portion extending toward the one side end of the radiator from the front and an upper wall portion extending toward an upper end of the radiator from the front and arranged in a manner not to have any substantial gap between it and the upper end of the radiator, air received from the front by the baffle device and led toward the front surface of the radiator can be inhibited from passing at least between the upper wall portion of the baffle device and the upper end of the radiator, so that a further large quantity of air can be made to enter the core portion of the radiator as compared with the case where a gap is provided between the upper wall portion and the upper end of the radiator. Thereby, the radiator can be improved in cooling efficiency.

With the vehicle in the one aspect, preferably, the outer wall portion comprises a side cover. With such a construction, a vehicle body can be made lightweight since the number of parts can be reduced as compared with the case where a side cover is provided separately from the outer wall portion.

With the vehicle provided with the side cover, preferably, there are further provided a front wheel and a front fork supporting the front wheel, and a front end of the side cover is formed to extend forwardly to an area adjacent the front fork. With such a construction, air having a large velocity of flow, passing outside the front fork, and not blocked in flow by the front fork can be taken into the baffle device, so that the radiator can be further improved in cooling efficiency.

With the vehicle provided with the side cover, preferably, an inner surface of the side cover and the upper wall portion of the baffle device are arranged so as to substantially have no gap therebetween. With such a construction, air received from the front by the side cover and led toward the front surface of the radiator can be inhibited from passing above the radiator, so that a further large quantity of air can be led to the core portion of the radiator. Consequently, the radiator can be improved in cooling efficiency.

With the vehicle in the one aspect, preferably, there are provided a front wheel and a front fork supporting the front wheel, and a front end of the outer wall portion is arranged outwardly of an outermost portion of the front fork as viewed from the front. With such a construction, air having a large velocity of flow, passing outside the front fork, and not blocked in flow by the front fork, can be taken into the baffle device, so that the radiator can be further improved in cooling efficiency.

With the vehicle in the one aspect, preferably, the baffle device further includes an inner wall portion extending toward the other end side of the radiator from the front. With such a construction, air received from the front by the baffle device and led toward the front surface of the radiator can be inhibited from passing outside of the radiator through a central portion of the vehicle, so that a further large quantity of an air can be led to the core portion of the radiator. Thereby, the radiator can be improved in cooling efficiency.

With the vehicle provided with the baffle device, which includes the inner wall portion, preferably, a region surrounded by the outer wall portion, the upper wall portion, and the inner wall portion of the baffle device is opened downward. With such a construction, for example, in the case where mud is splashed from the front during travel enters the region surrounded by the outer wall portion, the upper wall portion, and the inner wall portion of the baffle device, it is possible to inhibit mud, etc. from accumulating in the region surrounded by the outer wall portion, the upper wall portion, and the inner wall portion since mud, etc. can be discharged below the region surrounded by the outer wall portion, the upper wall portion, and the inner wall portion. In particular, such an arrangement is effective in a motorcycle of offroad specifications since mud, etc. are liable to enter the baffle device.

With the vehicle in the one aspect, preferably, there are provided a plurality of mudguard members in the form of vanes arranged in a region surrounded by the outer wall portion and the upper wall portion of the baffle device. With such a construction, it is possible to inhibit mud, etc. from striking against the front surface of the radiator in the case where mud, etc. are splashed from the front, so that it is possible to inhibit mud, etc. from adhering to the front surface of the radiator. Thereby, it is possible to inhibit a decrease in the cooling efficiency of the radiator.

With the vehicle provided with the mudguard members, preferably, the upper wall portion of the baffle device is formed integral with the mudguard members. With such a construction, a vehicle body can be made lightweight since the number of parts can be decreased as compared with the case where the upper wall portion of the baffle device and the mudguard members are provided separately from each other. Also, by being made integral with the upper wall portion, the mudguard members can be improved in mechanical strength.

With the vehicle provided with the mudguard members, preferably, the outer wall portion of the baffle device comprises a side cover, and an inner surface of the side cover and an outer edge portion of an outermost mudguard member are arranged so as to substantially have no gap therebetween. With such a construction, air received from the front by the side cover and led toward the front surface of the radiator can be inhibited from passing outside the radiator through a gap between the inner surface of the side cover and the outer edge portion of the outermost mudguard member, so that a further large quantity of an air can be led to the radiator. Consequently, the radiator can be further improved in cooling efficiency.

With the vehicle provided with the mudguard members, preferably, the plurality of mudguard members are arranged so that a front surface of the radiator is not seen when viewed from the front. With such a construction, mud, etc. can be readily inhibited from striking against the front surface of the radiator in the case where mud, etc. are splashed from the front.

With the vehicle provided with the mudguard members, preferably, there is further provided an inner wall portion extending toward the other end side of the radiator from the front, the mudguard members have a baffle function, and the mudguard members integrally comprise a front baffle portion provided on the front of the mudguard members to extend in a direction, in which the outer wall portion extends, as viewed in plan view, and a rear baffle portion provided rearwardly of the front baffle portion to project toward the inner wall portion and formed so that a front surface of the radiator is not seen as viewed from the front and it is contiguous to the front baffle portion. Having the front baffle portions formed in a manner to extend in a direction in which the outer wall portion extends can lead air smoothly rearward along the outer wall portion. Also, by providing, on the mudguard members, the rear baffle portion so that a front surface of the radiator is not seen as viewed from the front and it is contiguous to the front baffle portion, it is possible to further easily inhibit mud, etc. from striking against the front surface of the radiator in the case where mud, etc. are splashed from the front.

In this case, preferably, the rear end of the rear baffle portion of the mudguard members are formed to extend substantially perpendicular to the front surface of the radiator as viewed in plan view. With such a construction, since the direction in which air is led by the front baffle portion and the rear baffle portion can be made substantially perpendicular to the front surface of the radiator, air entering the core portion of the radiator can be efficiently passed rearward. Thereby, it is possible to further improve the radiator in cooling efficiency.

In the vehicle provided with the mudguard members, preferably, the plurality of mudguard members are connected together by a mudguard plate, which is arranged in the vicinity of a lower portion of a front surface of the radiator and has a mudguard function. With such a construction, mud, etc. can be readily inhibited by the mudguard plate from striking against the front surface of the radiator in the case where mud, etc. are splashed from below.

With the vehicle provided with the baffle device, which includes the inner wall portion, preferably, a sealing member is arranged at least between a rear end of the outer wall portion of the baffle device and the one side end of the radiator, between a rear end of the upper wall portion of the baffle device and an upper end of the radiator, and between a rear end of the inner wall portion of the baffle device and the other end side of the radiator. With such a construction, it is possible to readily inhibit the formation of any gap between the baffle device and the radiator.

With the vehicle provided with the baffle device, which includes the inner wall portion, preferably, the outer wall portion, the upper wall portion, and the inner wall portion are formed integrally. With such a construction, it is possible to readily inhibit formation of a gap between the outer wall portion and the upper wall portion and between the upper wall portion and the inner wall portion, so that it is possible to inhibit air from passing between the outer wall portion and the upper wall portion and between the upper wall portion and the inner wall portion. Thereby, a further large quantity of an air can be made to enter the core portion of the radiator.

With the vehicle provided with the baffle device, which includes the inner wall portion, preferably, a front end of the outer wall portion is positioned forwardly of a front end of the inner wall portion. With such a construction, air having a large velocity of flow and not blocked in flow by the front fork can be readily taken into the baffle device.

With the vehicle in the one aspect, preferably, the outer wall portion is formed to be in the form of a flat surface. With such a construction, air can be led straight along the outer wall portion, so that it is possible to minimize any decrease in velocity of air flow.

With the vehicle in the one aspect, preferably, the baffle device is fixed to the radiator. With such a construction, it is possible to readily form the outer wall portion so as to make the same extend toward the one side end and to readily form the upper wall portion so as to make the same extend toward the upper end.

With the vehicle in the one aspect, preferably, there is further provided a side cover arranged in a manner to cover at least a part of a side of the outer wall portion, and an outermost portion of the outer wall portion is arranged in the same position as that of an outermost portion of the side cover in a width direction, or inwardly of the outermost portion of the side cover as viewed from the front. With such a construction, it is possible to inhibit an increase in vehicle width even in case of the provision of the baffle device.

With the vehicle in the one aspect, preferably, there is further provided a side cover arranged in a manner to cover at least a part of a side of the outer wall portion, and a front end of the outer wall portion is arranged to extend forwardly of a front end of the side cover. With such a construction, air having a large velocity of flow and not blocked in flow by the front fork, etc. can be taken into the baffle device by the front end of the outer wall portion, which is arranged to extend forwardly of the front end of the side cover.

Preferably, the vehicle in the one aspect comprises a motorcycle of offroad specifications. By applying the vehicle having any one of the constructions described above to a motorcycle of offroad specifications, it is possible to readily obtain a motorcycle of offroad specifications that has a radiator with improved cooling efficiency.

PREFERRED EMBODIMENTS

An embodiment of the invention will now be described below with reference to the drawings.

Figure 1:
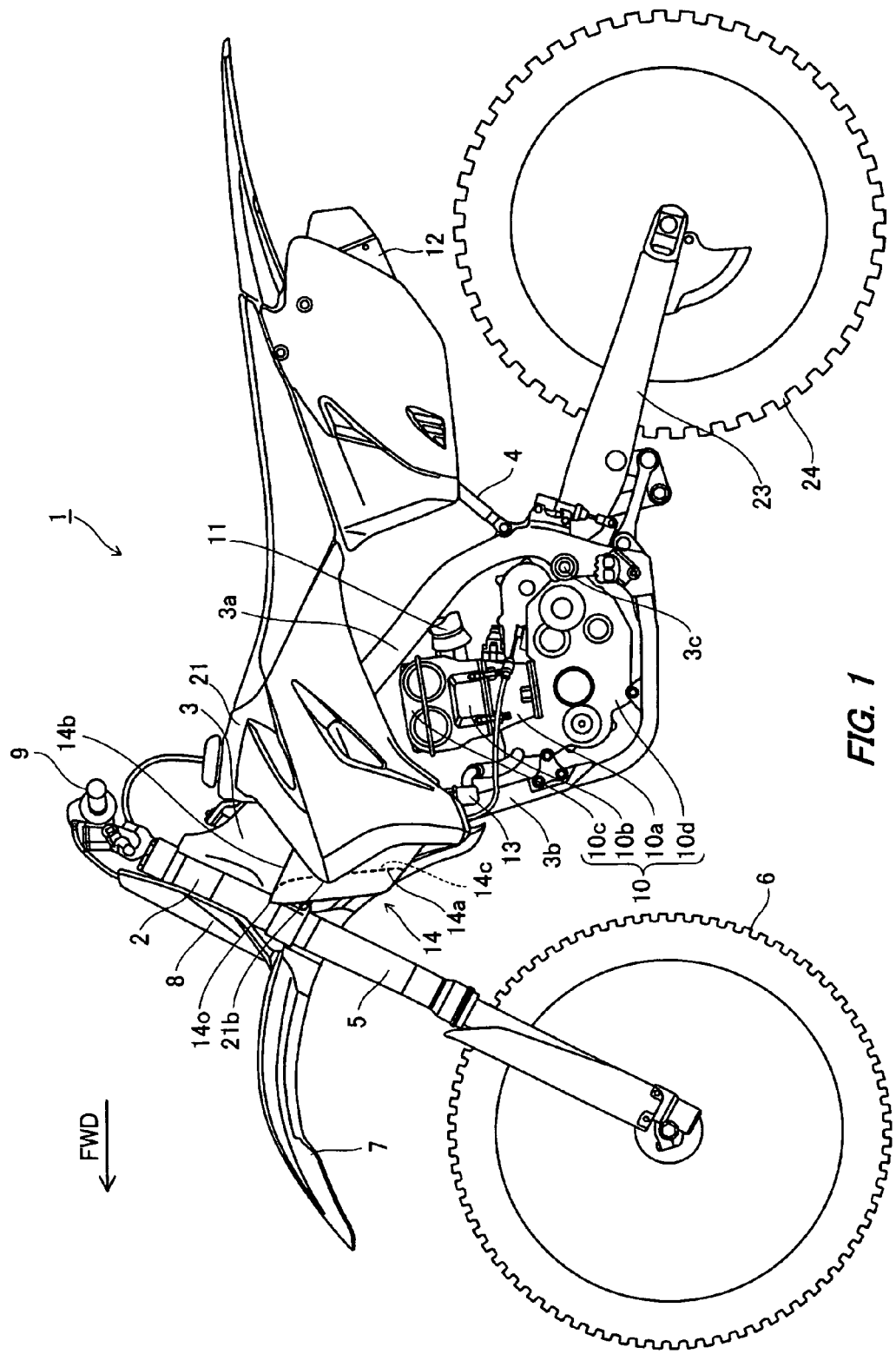
FIG. 1 is a left side view showing a motorcycle according to a first embodiment of the invention.

FIG. 1 is a side view showing a motorcycle according to a first embodiment of the invention. FIGS. 2 to 9 are views illustrating, in detail, a construction around a radiator of the motorcycle, according to the first embodiment, shown in FIG. 1. In addition, the first embodiment is described with respect to a motorcycle of offroad specifications as an example of a vehicle according to the invention. In other embodiments, however, the invention may be applied to other types of vehicles. In the drawings, a direction indicated by an arrow FWD indicates the front in a traveling direction of the motorcycle. First, a construction of the motorcycle 1 according to the first embodiment will be described with reference to FIGS. 1 to 9.

In the motorcycle 1 according to the first embodiment of the invention, a main frame 3 extending in a longitudinal direction is arranged rearwardly of a head pipe 2 as shown in FIG. 1. Also, the main frame 3 includes an upper frame portion 3a extending rearward from above and a lower frame portion 3b extending rearward from below. Also, a back stay 4 is connected between the upper frame portion 3a and a rear end of a seat rail (not shown). A body frame is constituted by the head pipe 2, the main frame 3, the seat rail (not shown), and the back stay 4.

Also, arranged below the head pipe 2 are a pair of shock absorbers 5a, 5b forming a front fork 5. A front wheel 6 is mounted rotatably to lower ends of the pair of shock absorbers 5a, 5b and hence the front fork 5. Also, a front fender 7 is arranged above the front wheel 6. Also, a Zeichen plate 8 covering the front of the head pipe 2 is provided forwardly of the head pipe 2. The Zeichen plate 8 is provided not to cut off the flow of air flowing into baffle devices 14, 15. Also, a handle 9 is mounted to an upper portion of the head pipe 2 to be able to turn.

In the present embodiment, an engine 10 is mounted below the upper frame portion 3a of the main frame 3. The engine 10 includes a cylinder portion 10a, a cylinder head portion 10b, a cylinder head cover portion 10c, and a crank case 10d. Also, an exhaust pipe 11 is mounted to the engine 10. The exhaust pipe 11 extends rearward and is connected to a muffler 12.

Figure 2:
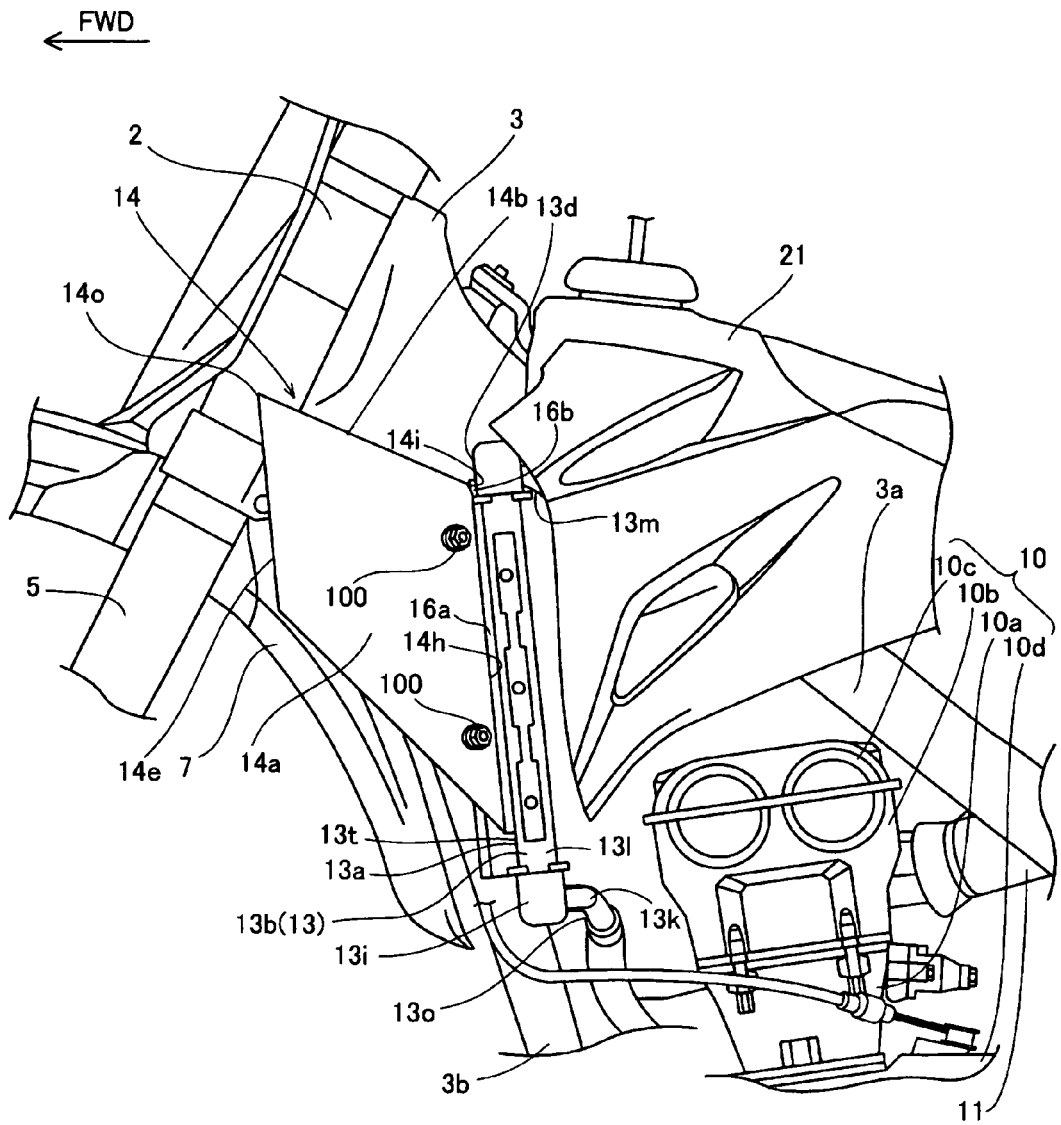
FIG. 2 is a left-side view illustrating the construction around a radiator of the motorcycle, according to the first embodiment, shown in FIG. 1.
Figure 3:
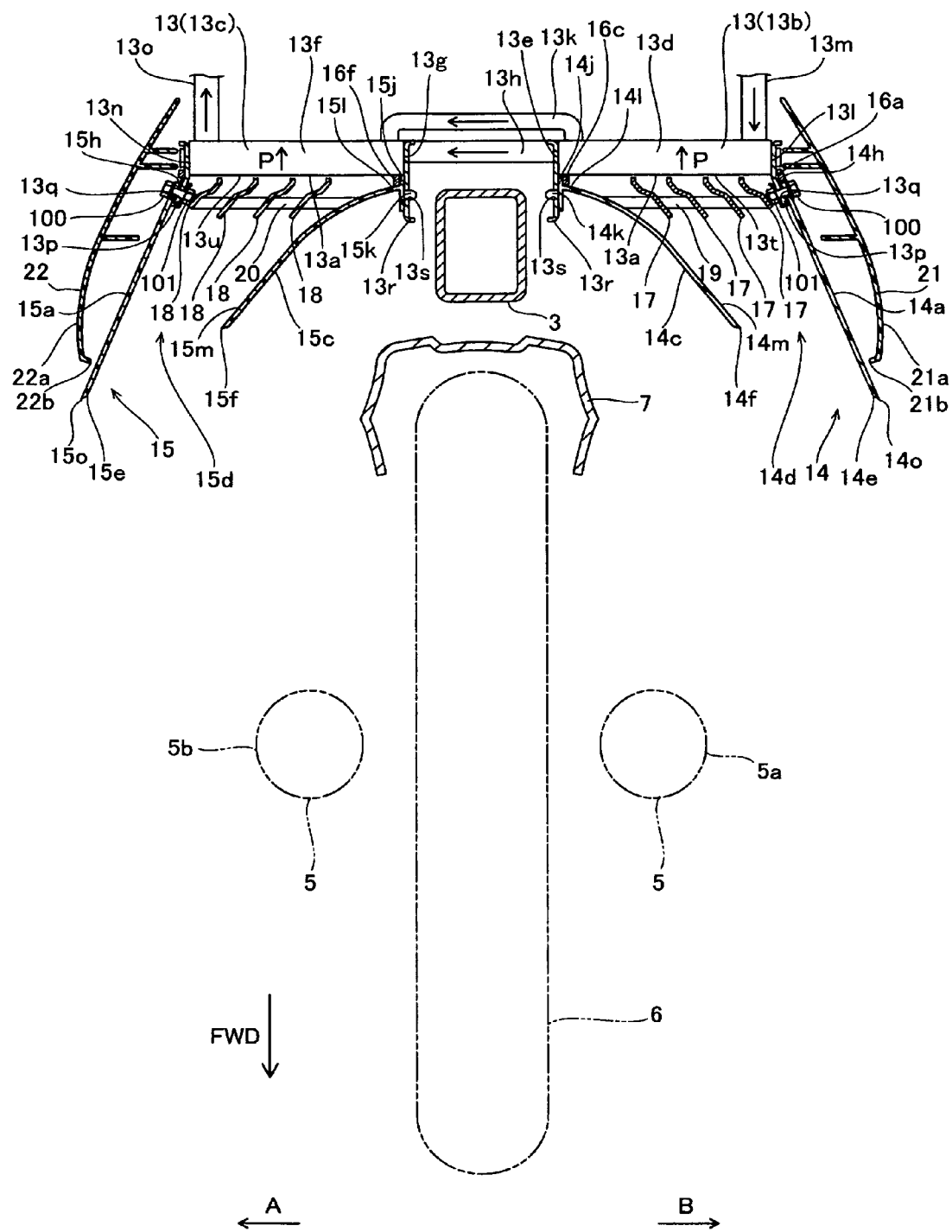
FIG. 3 is a plan view illustrating the construction around the radiator of the motorcycle, according to the first embodiment, shown in FIG. 1.

Also, a radiator 13 serving to cool the engine 10 is arranged rearwardly of the head pipe 2 as shown in FIG. 2. The radiator 13 is provided with a core portion 13a, which functions to permit air to pass in the direction (rearward) of arrow P and to permit cooling water to flow therethrough as shown in FIG. 3. That is, the radiator 13 has a core portion 13a for cooling a coolant, such as cooling water. Also, the cooling water cooled by the radiator 13 flows through the engine 10 to cool the engine 10.

Figure 4:
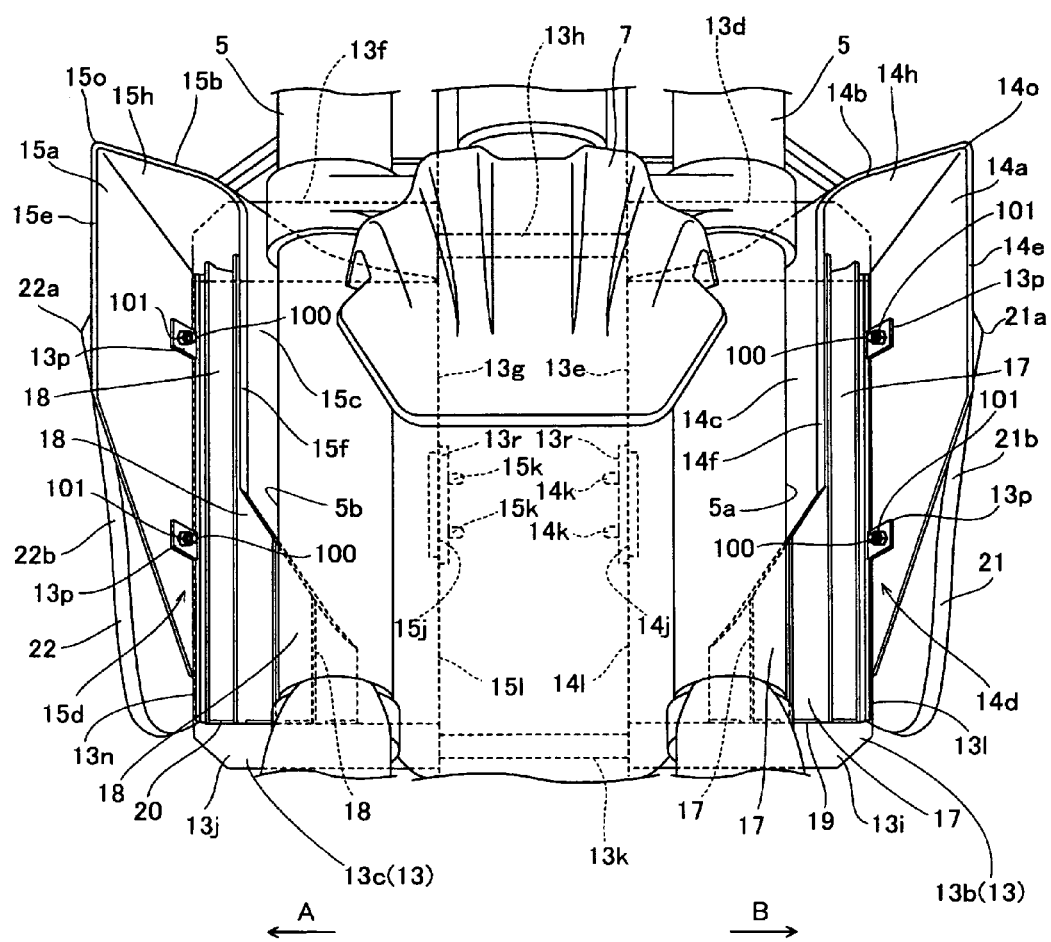
FIG. 4 is a front view illustrating the construction around the radiator of the motorcycle, according to the first embodiment, shown in FIG. 1.

Also, the radiator 13 includes a left radiator 13b and a right radiator 13c. The left radiator 13b and the right radiator 13c, respectively, are arranged to interpose therebetween the main frame 3 from both left and right sides (a side indicated by an arrow A and a side indicated by an arrow B). Also, as shown in FIG. 4, a connection pipe 13h connects between a portion of an upper portion 13d of the radiator 13b toward an inner side 13e and a portion of an upper portion 13f of the radiator 13c toward an inner side 13g. The upper portions 13d, 13f are examples of the term "upper end" of the radiator used throughout the present application, and the inner sides 13e, 13g are examples of the term "the other side end" used throughout the application. Also, a connection pipe 13k connects between a portion of a lower portion 13i of the radiator 13b toward the inner side 13e and a portion of a lower portion 13j of the radiator 13c toward the inner side 13g. The connection pipes 13h, 13k allow cooling water to flow to the radiator 13c from the radiator 13b. Also, as shown in FIGS. 2 and 3, an inflow pipe 13m connected to the cylinder portion 10a (see FIG. 2) of the engine 10 is provided on a portion of the upper portion 13d of the radiator 13b toward an outer side 13l. Also, an outflow pipe 13o connected to the crank case 10d (see FIG. 2) of the engine 10 is provided on a portion of the lower portion 13j (see FIG. 4) of the radiator 13c (see FIG. 3) toward an outer side 13n (see FIG. 3). The outer sides 13l, 13n are examples of the term "one side end" of the radiator used throughout the application. Also, as shown in FIG. 3, the core portion 13a of the radiator 13b is provided between the inner side 13e and the outer side 13l, which are spaced away from each other in a vehicle width direction (the direction of the arrow A and the direction of the arrow B), and the core portion 13a of the radiator 13c is provided between the inner side 13g and the outer side 13n, which are spaced away from each other in the vehicle width direction (the direction of the arrow A and the direction of the arrow B).

Also, as shown in FIGS. 3 and 4, a pair of stays 13p are provided on the outer side 13l of the radiator 13b and the outer side 13n of the radiator 13c in a manner to project forwardly of the radiator 13. A screw insertion hole 13q is provided in each of the respective stays 13p. Also, a stay 13r is provided on each of the inner side 13e of the radiator 13b and the inner side 13g of the radiator 13c in a manner to project forwardly of the radiator 13. Also, a pair of boss insertion holes 13s are provided on each of the stays 13r. The screw insertion holes 13q and the boss insertion holes 13s are provided in order to fix the baffle devices 14, 15, described later, to the radiator 13.

Figure 5:
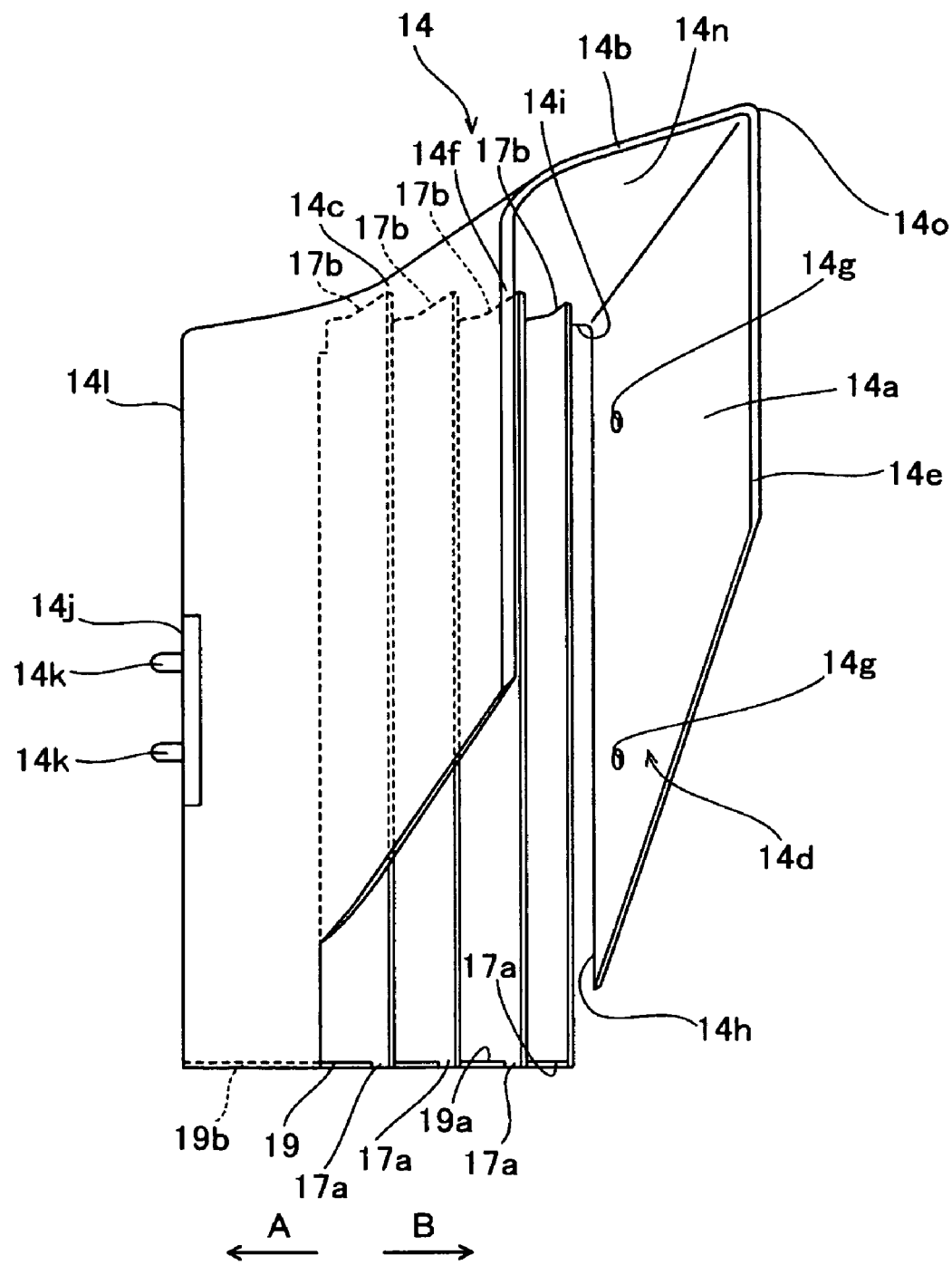
FIG. 5 is a front view illustrating the construction of a baffle device, a mudguard member, and a mudguard plate on the right of the motorcycle as viewed from the front, according to the first embodiment, shown in FIG. 1.

The baffle devices 14, 15 according to the first embodiment, as shown in FIG. 4, are made of a resin and mounted to the radiator 13. Specifically, the baffle device 14 is fixed to the radiator 13b and the baffle device 15 is fixed to the radiator 13c. As shown in FIG. 5, the baffle device 14 includes an outer wall portion 14a, an upper wall portion 14b, and an inner wall portion 14c. The outer wall portion 14a, the upper wall portion 14b, and the inner wall portion 14c are formed integrally in the present embodiment. As a result, no gaps are defined between the outer wall portion 14a and the upper wall portion 14b and between the upper wall portion 14b and the inner wall portion 14c.

Also, according to the first embodiment, a region surrounded by the outer wall portion 14a, the upper wall portion 14b, and the inner wall portion 14c of the baffle device 14 is opened downward. That is, an opening 14d is formed in the baffle device 14. In the case where mud, etc. are splashed from the front during travel and enters the region surrounded by the outer wall portion 14a, the upper wall portion 14b, and the inner wall portion 14c of the baffle device 14, it is possible to inhibit mud, etc. from accumulating in the region surrounded by the outer wall portion 14a, the upper wall portion 14b, and the inner wall portion 14c since mud, etc. can be discharged below the region surrounded by the outer wall portion 14a, the upper wall portion 14b, and the inner wall portion 14c through the opening 14d.

Figure 6:
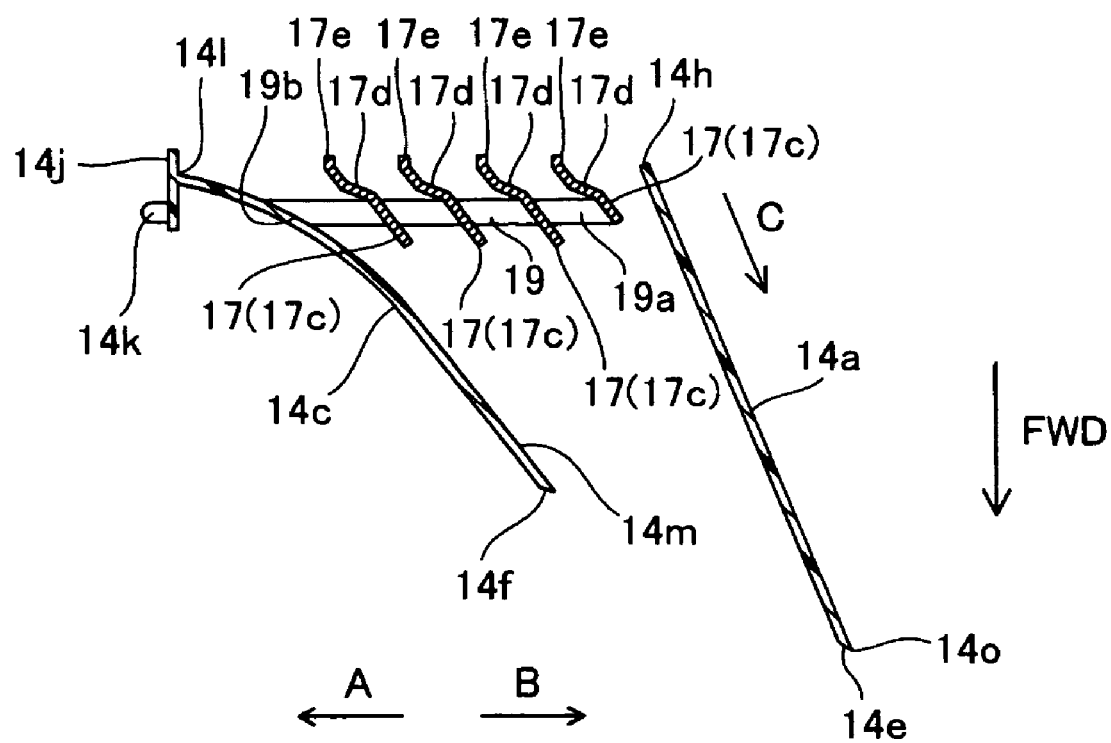
FIG. 6 is a cross sectional view illustrating the construction of the baffle device, the mudguard member, and the mudguard plate on the right of the motorcycle as viewed from the front, according to the first embodiment, shown in FIG. 1.

Also, according to the first embodiment, a front end 14e of the outer wall portion 14a is positioned forward of a front end 14f of the inner wall portion 14c and both are positioned outward (a side indicated by the arrow B) of the outermost portion of shock absorber 5a (see FIG. 4) of the front fork 5 as viewed from the front (a side indicated by the arrow FWD) as shown in FIGS. 4 and 6. That is, the baffle device 14 is structured to improve the cooling efficiency of the radiator 13b since air having a large velocity of flow can be taken into the baffle device 14 without being blocked by the front fork 5. Also, the baffle device 14 is formed so that the outer wall portion 14a and the inner wall portion 14c diverge toward the radiator 13b as shown in FIG. 3. Thereby, air that flows into the baffle device 14 can be led to the whole core portion 13a of the radiator 13b.

Also, according to the first embodiment, the outer wall portion 14a is formed as shown in FIG. 3 to extend from the outer side 13l of the radiator 13b in a traveling direction (a direction indicated by the arrow FWD) to form an included obtuse angle with the front surface 13t of the radiator 13b and to be in the form of a flat surface. Also, a rear portion of the outer wall portion 14a is provided with screw insertion holes 14g in two locations as shown in FIG. 5. As shown in FIGS. 3 and 4, the screw insertion holes 14g, respectively, are positioned to align with screw insertion holes 13q of stays 13p (see FIG. 3) in two locations on the radiator 13b and are used to mount baffle 14 to radiator 13 by bolts 100 and nuts 101. Also, a sealing member 16a, preferably made of sponge, is arranged between a front portion of the outer side 13l of the radiator 13b and a rear end 14h of the outer wall portion 14a as shown in FIGS. 2 and 3. The sealing member 16a is preferably bonded to a whole surface of the rear end 14h of the outer wall portion 14a and formed to have a predetermined thickness. Also, the sealing member 16a functions to inhibit formation of a gap between the front portion of the outer side 13l of the radiator 13b and the rear end 14h of the outer wall portion 14a. That is, the outer wall portion 14a is arranged so as not to have a substantial gap between it and the outer side 13l of the radiator 13b.

Also, according to the first embodiment, the upper wall portion 14b is formed as shown in FIGS. 2 and 4 to extend from the upper portion 13d of the radiator 13b in the traveling direction (direction indicated by the arrow FWD) to form an included obtuse angle with the front surface 13t of the radiator 13b. Also, as shown in FIG. 2, a sealing member 16b, preferably made of sponge, is arranged between the upper portion 13d of the radiator 13b and a rear end 14i of the upper wall portion 14b. The sealing member 16b is preferably bonded to a whole surface of the rear end 14i of the upper wall portion 14b and formed to have a predetermined thickness. Also, the sealing member 16b functions to inhibit formation of a gap between the upper portion 13d of the radiator 13b and the rear end 14i of the upper wall portion 14b. That is, the upper wall portion 14b is arranged so as not to have a substantial gap between it and the upper portion 13d of the radiator 13b.

Also, according to the first embodiment, the inner wall portion 14c is formed as shown in FIG. 3 to extend from the inner side 13e of the radiator 13b in the traveling direction (direction indicated by the arrow FWD) to form an included acute angle with the front surface 13t of the radiator 13b, while being bent in the direction of the arrow FWD. That is, the inner wall portion 14c is formed so that the front fork 5 and the front fender 7 do not contact with the inner wall portion 14c when the handle 9 is turned in the direction of the arrow A. Also, a surface portion 14j in the form of a flat plate is formed on a rear portion of the inner wall portion 14c and is made integral with the inner wall portion 14c. The surface portion 14j in the form of a flat plate is structured to be positioned opposite stay 13r of the radiator 13b. Two boss portions 14k are provided integrally on the surface portion 14j. As shown in FIGS. 3 and 5, the two boss portions 14k are positioned so that they are inserted into the boss insertion holes 13s (see FIG. 3), which are provided in the stay 13r (see FIG. 3). Also, as shown in FIG. 3, a sealing member 16c, preferably made of sponge, is arranged between a front portion of the inner side 13e of the radiator 13b and a rear end 141 of the inner wall portion 14c. The sealing member 16c is preferably bonded to the rear end 141 of the inner wall portion 14c in a manner to be clear of the surface portion 14j in the form of a flat plate and to extend vertically. Also, the sealing member 16c is formed to have a predetermined thickness and functions to inhibit formation of a gap between the front portion of the inner side 13e of the radiator 13b and the rear end 141 of the inner wall portion 14c. That is, the inner wall portion 14c is arranged so as not to have a substantial gap between it and the inner side 13e of the radiator 13b.

The baffle device 15 is fixed to the radiator 13c in the same manner as the baffle device 14 is fixed to the radiator 13b. That is, the baffle device 15 is formed to have a shape of bilateral symmetry with respect to the baffle device 14 about a center of a vehicle as viewed from the front of the vehicle.

Figure 7:
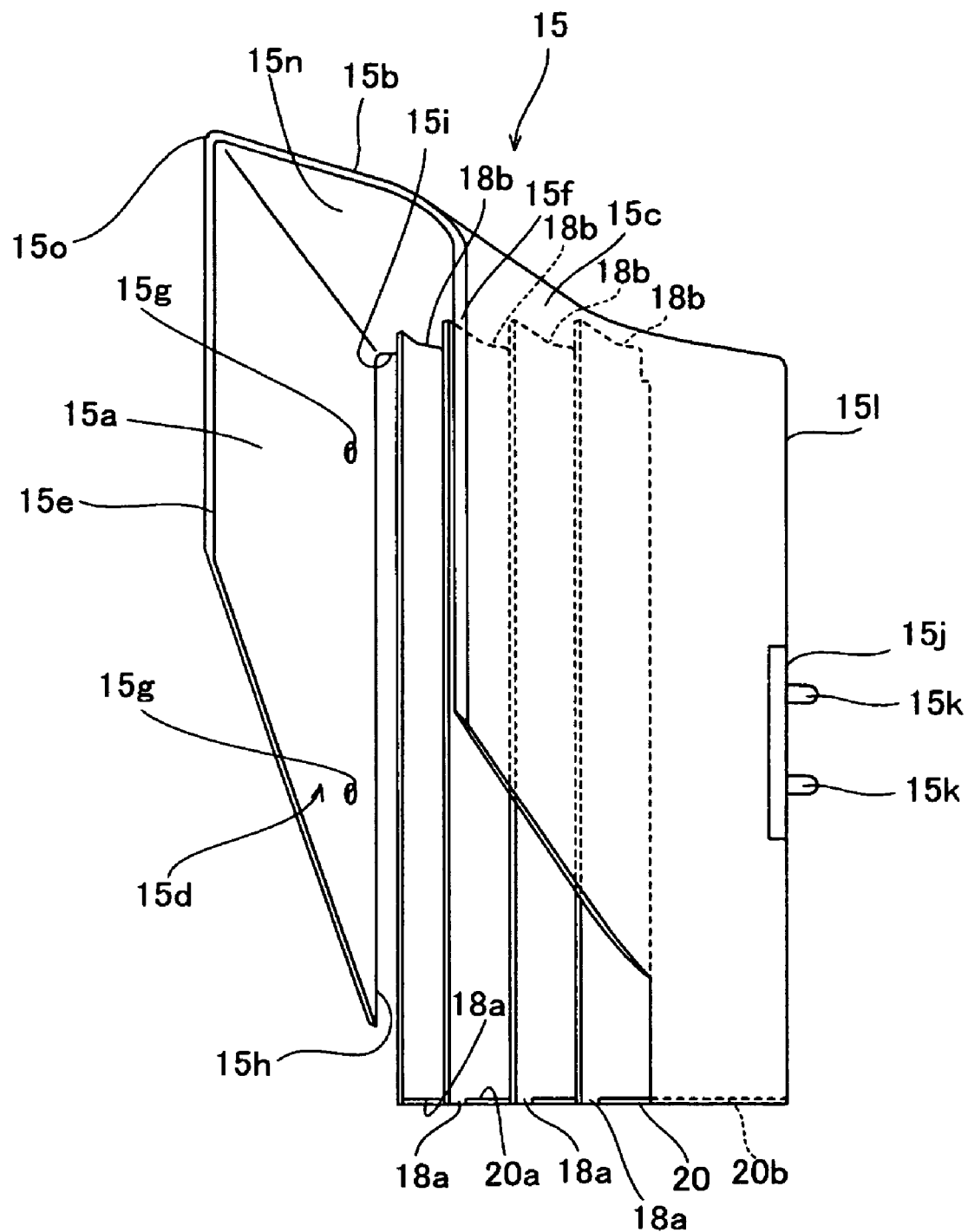
FIG. 7 is a front view illustrating the construction of a baffle device, a mudguard member, and a mudguard plate on the left of the motorcycle as viewed from the front, according to the first embodiment, shown in FIG. 1.

Specifically, according to the first embodiment, the baffle device 15 includes an outer wall portion 15a, an upper wall portion 15b, and an inner wall portion 15c as shown in FIG. 7. The outer wall portion 15a, the upper wall portion 15b, and the inner wall portion 15c are formed integrally in the present embodiment. As a result, no gaps are provided between the outer wall portion 15a and the upper wall portion 15b and between the upper wall portion 15b and the inner wall portion 15c.

Also, according to the first embodiment, a region surrounded by the outer wall portion 15a, the upper wall portion 15b, and the inner wall portion 15c of the baffle device 15 is opened downward. That is, an opening 15d is formed in the baffle device 15. In the case where mud, etc. are splashed from the front during travel and enters the region surrounded by the outer wall portion 15a, the upper wall portion 15b, and the inner wall portion 15c of the baffle device 15, it is possible to inhibit mud, etc. from accumulating in the region surrounded by the outer wall portion 15a, the upper wall portion 15b, and the inner wall portion 15c since mud, etc. can be discharged below the region surrounded by the outer wall portion 15a, the upper wall portion 15b, and the inner wall portion 15c through the opening 15d.

Figure 8:
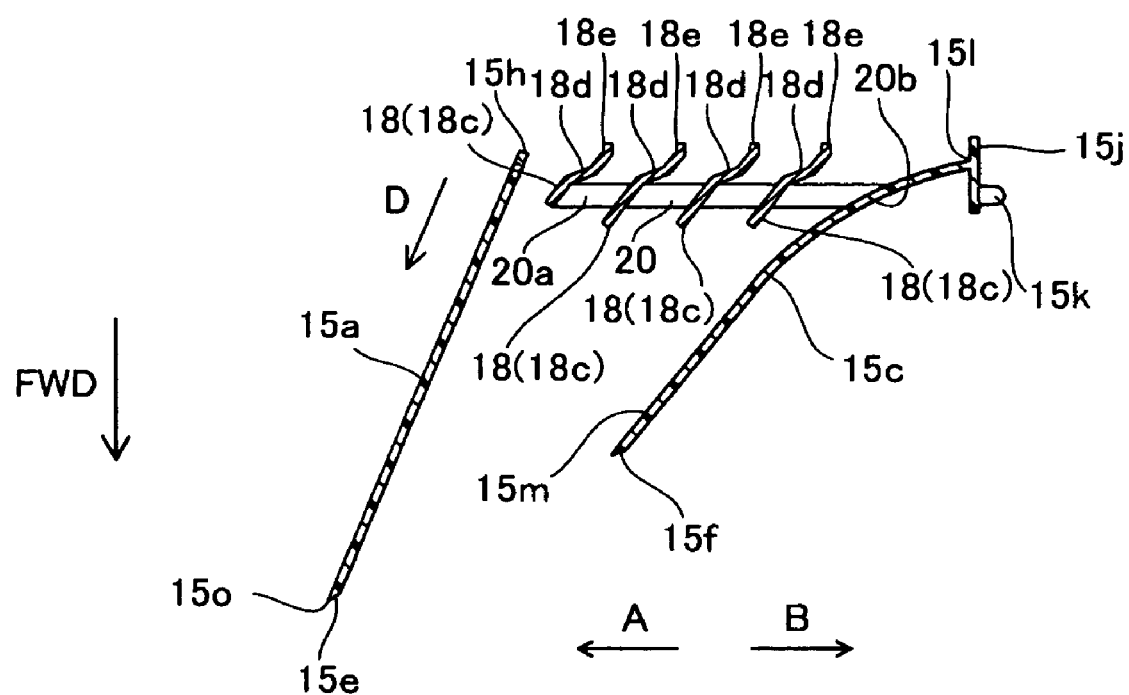
FIG. 8 is a cross sectional view illustrating the construction of the baffle device, the mudguard member, and the mudguard plate on the left of the motorcycle as viewed from the front, according to the first embodiment, shown in FIG. 1.

Also, according to the first embodiment, as shown in FIGS. 4 and 8, a front end 15e of the outer wall portion 15a is positioned forward of a front end 15f of the inner wall portion 15c and both are positioned outward (a side indicated by the arrow A) of the outermost portions of shock absorber 5b (see FIG. 4) of the front fork 5 as viewed from the front (a side indicated by the arrow FWD). That is, the baffle device 15 is structured to improve the cooling efficiency of the radiator 13c since air having a large velocity of flow can be taken into the baffle device 15 without being blocked by the front fork 5. Also, the baffle device 15 is formed so that the outer wall portion 15a and the inner wall portion 15c diverge toward the radiator 13c as shown in FIG. 3. Thereby, air that flows into the baffle device 15 can be led to the whole core portion 13a of the radiator 13c.

Figure 9:
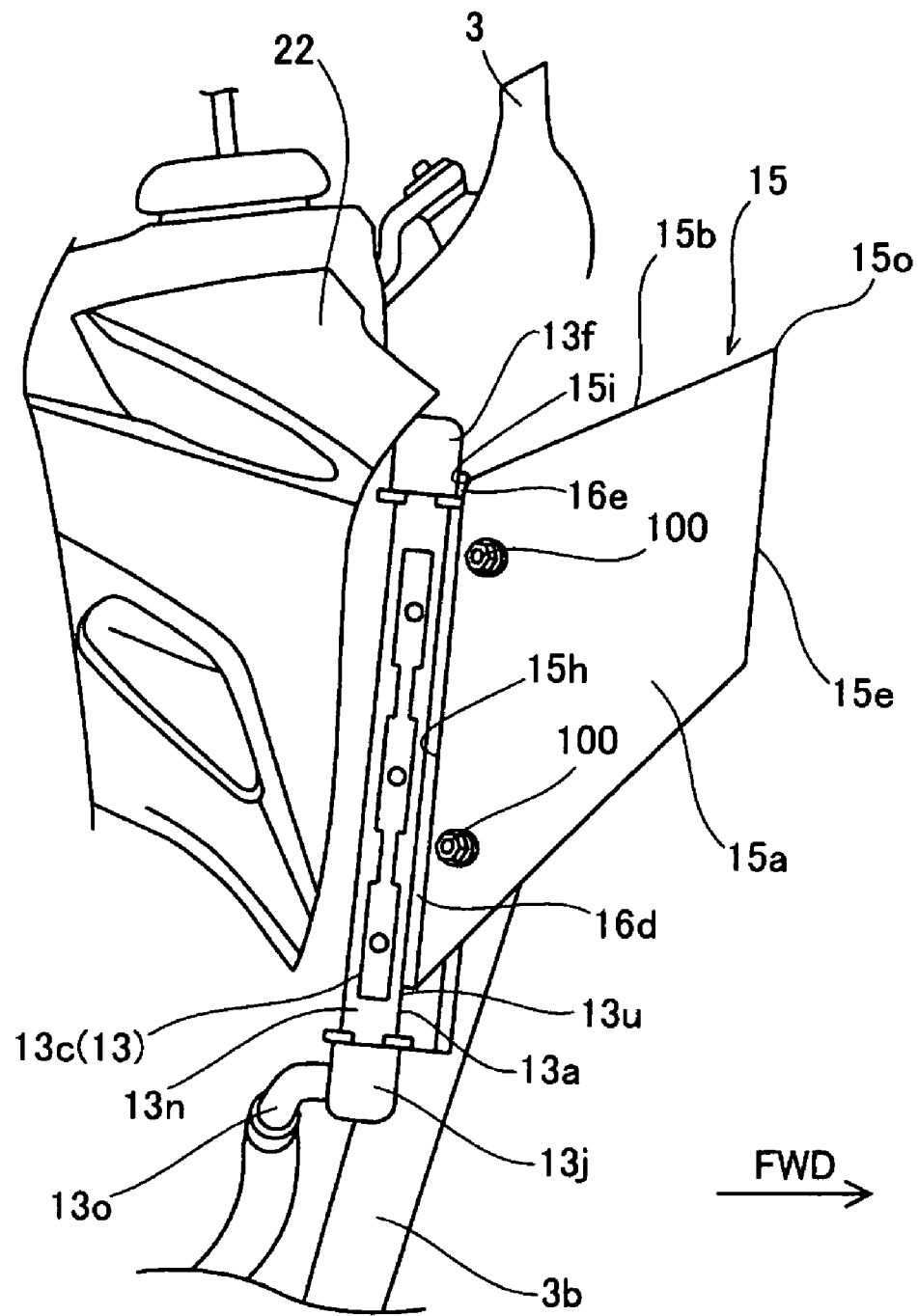
FIG. 9 is a right-side view illustrating the construction around the radiator of the motorcycle, according to the first embodiment, shown in FIG. 1.

Also, according to the first embodiment, the outer wall portion 15a is formed as shown in FIG. 3 to extend from the outer side 13n of the radiator 13c in the traveling direction (a direction indicated by the arrow FWD) to form an included obtuse angle with the front surface 13u of the radiator 13c and to be in the form of a flat surface. Also, a rear portion of the outer wall portion 15a is provided with screw insertion holes 15g in two locations as shown in FIG. 7. As shown in FIGS. 3 and 4, the screw insertion holes 15g, respectively, are positioned to align with screw insertion holes 13q of stays 13p (see FIG. 3) in two locations on the radiator 13c and are used to mount baffle 15 to radiator 13c by the bolts 100 and the nuts 101. Also, a sealing member 16d, preferably made of sponge, is arranged between a front portion of the outer side 13n of the radiator 13c and a rear end 15h of the upper wall portion 15b as shown in FIGS. 3 and 9. The sealing member 16d is preferably bonded to a whole surface of the rear end 15h of the outer wall portion 15a and formed to have a predetermined thickness. Also, the sealing member 16d functions to inhibit formation of a gap between the front portion of the outer side 13n of the radiator 13c and the rear end 15h of the outer wall portion 15a. That is, the outer wall portion 15a is arranged so as not to have a substantial gap between it and the outer side 13n of the radiator 13c.

Also, according to the first embodiment, the upper wall portion 15b is formed as shown in FIGS. 4 and 9 to extend from the upper portion 13f of the radiator 13c in the traveling direction (direction indicated by the arrow FWD) to form an included obtuse angle with the front surface 13u of the radiator 13c. Also, as shown in FIG. 9, a sealing member 16e, preferably made of sponge, is arranged between the upper portion 13f of the radiator 13c and a rear end 15i of the upper wall portion 15b. The sealing member 16e is preferably bonded to a whole surface of the rear end 15i of the upper wall portion 15b and formed to have a predetermined thickness. Also, the sealing member 16e functions to inhibit formation of a gap between the upper portion 13f of the radiator 13c and the rear end 15i of the upper wall portion 15b. That is, the upper wall portion 15b is arranged so as not to have a substantial gap between it and the upper portion 13f of the radiator 13c.

Also, according to the first embodiment, the inner wall portion 15c is formed as shown in FIG. 3 to extend from the inner side 13g of the radiator 13c in the traveling direction (direction indicated by the arrow FWD) to form an included acute angle with the front surface 13u of the radiator 13c, while being bent in the direction of the arrow FWD. That is, the inner wall portion 15c is formed so that the front fork 5 and the front fender 7 do not contact with the inner wall portion 15c when the handle 9 is turned in the direction of the arrow B. Also, a surface portion 15j in the form of a flat plate is formed on a rear portion of the inner wall portion 15c and is made integral with the inner wall portion 15c. The surface portion 15j in the form of a flat plate is structured to be positioned opposite stay 13r of the radiator 13c. Two boss portions 15k are provided integrally on the surface portion 15j. As shown in FIGS. 3 and 7, the two boss portions 15k are positioned so that they are inserted into the two boss insertion holes 13s (see FIG. 3), which are provided in the stay 13r (see FIG. 3) of the radiator 13c. Also, as shown in FIG. 3, a sealing member 16f, preferably made of sponge, is arranged between a front portion of the inner side 13g of the radiator 13c and a rear end 151 of the inner wall portion 15c as shown in FIG. 3. The sealing member 16f is preferably bonded to the rear end 151 of the inner wall portion 15c in a manner to be clear of the surface portion 15j in the form of a flat plate and to extend vertically. Also, the sealing member 16f is formed to have a predetermined thickness and functions to inhibit formation of a gap between the front portion of the inner side 13g of the radiator 13c and the rear end 151 of the inner wall portion 15c. That is, the inner wall portion 15c is arranged so as not to have a substantial gap between it and the inner side 13g of the radiator 13c.

Also, according to the first embodiment, a plurality of mudguard members 17 in the form of a vane are provided in a region surrounded by the outer wall portion 14a, the upper wall portion 14b, and the inner wall portion 14c of the baffle device 14, and a plurality of mudguard members 18 in the form of a vane are provided in a region surrounded by the outer wall portion 15a, the upper wall portion 15b, and the inner wall portion 15c of the baffle device 15. These mudguard members 17, 18 function to inhibit mud, etc. splashed from the front from striking against the radiator 13 and to direct the flow of air through the radiator 13.

Also, according to the first embodiment, a mudguard plate 19 is arranged in the vicinity of the lower portion 13i (see FIG. 4) of a front surface 13t (see FIG. 3) of the radiator 13b of the baffle device 14 as shown in FIGS. 3 and 4. Also, the mudguard plate 19 functions to inhibit mud, etc. splashed from below the motorcycle 1 from striking against the front surface 13t of the radiator 13b. Also, the mudguard plate 19 connects the plurality of mudguard members 17 together as shown in FIG. 5. Specifically, the mudguard plate 19 is provided to be made integral with the plurality of mudguard members 17 and an upper surface portion 19a of the mudguard plate 19 is connected to lower portions 17a of the plurality of mudguard members 17. Also, as shown in FIG. 6, one end 19b of the mudguard plate 19 is connected to a lower portion of an inner surface 14m of the inner wall portion 14c in the vicinity of the rear end 141. Also, upper portions 17b of the plurality of mudguard members 17 are connected to an inner surface 14n of the upper wall portion 14b in the vicinity of the rear end 14i as shown in FIG. 5.

Also, according to the first embodiment, the plurality of mudguard members 17 are arranged as shown in FIG. 4 so that the front surface 13t (see FIG. 3) of the radiator 13b is not seen as viewed from the front (along the arrow FWD). Specifically, the plurality of mudguard members 17 are mounted to the baffle device 14 to have a predetermined angle to the traveling direction (direction indicated by the arrow FWD). Also, the mudguard members 19 are substantially S-shaped in cross section as shown in FIG. 6 and comprise a front baffle portion 17c provided on the front of the mudguard members 17 and a rear baffle portion 17d provided rearwardly of the front baffle portion 17c and formed to be contiguous to the front baffle portion 17c. The front baffle portions 17c are formed to extend in a direction substantially along a direction (direction indicated by an arrow C) in which the outer wall portion 14a extends straight, as viewed in plan view, and function to lead air entering the baffle device 14 smoothly rearward. Also, the rear baffle portion 17d is provided rearwardly of the front baffle portion 17c to project toward the inner wall portion 14c (direction indicated by the arrow B) and formed so that the front surface 13t (see FIG. 3) of the radiator 13b (see FIG. 3) is not seen as viewed from the front (direction indicated by the arrow FWD). Also, the rear baffle portion 17d is formed integral with the front baffle portion 17c to be contiguous thereto. Also, the rear end 17e of the rear baffle portion 17d is formed to extend substantially perpendicular (direction indicated by the arrow FWD) to the front surface 13t (see FIG. 3) of the radiator 13b (see FIG. 3) as viewed in plan view and functions to make air flow in a direction substantially perpendicular to the front surface 13t (see FIG. 3) of the radiator 13b (see FIG. 3). Thereby, air entering the core portion 13a (see FIG. 3) of the radiator 13b (see FIG. 3) can be made to efficiently pass rearward, so that it is possible to improve the radiator 13b (see FIG. 3) in cooling efficiency.

Also, according to the first embodiment, the mudguard members 18 are provided in the baffle device 15 in the same manner the mudguard members 17 are provided in the baffle device 14. A mudguard plate 20 is arranged in the vicinity of the lower portion 13j (see FIG. 4) of a front surface 13u (see FIG. 3) of the radiator 13c of the baffle device 15 as shown in FIGS. 3 and 4. Also, the mudguard plate 20 functions to inhibit mud, etc. splashed from below the motorcycle 1 from striking against the front surface 13u of the radiator 13c. Also, the mudguard plate 20 connects thereto the plurality of mudguard members 18 as shown in FIG. 7. Specifically, the mudguard plate 20 is provided to be made integral with the plurality of mudguard members 18 and an upper surface portion 20a of the mudguard plate 20 is connected to lower portions 18a of the plurality of mudguard members 18. Also, as shown in FIG. 8, one end 20b of the mudguard plate 20 is connected to a lower portion of an inner surface 15m of the inner wall portion 15c in the vicinity of the rear end 151. Also, upper portions 18b of the plurality of mudguard members 18, respectively, are connected to an inner surface 15n of the upper wall portion 15b in the vicinity of the rear end 15i as shown in FIG. 7.

Also, according to the first embodiment, the plurality of mudguard members 18 are arranged as shown in FIG. 4 so that the front surface 13u (see FIG. 3) of the radiator 13c is not seen as viewed from the front (along the arrow FWD). Specifically, the plurality of mudguard members 18 are mounted to the baffle device 15 to have a predetermined angle to the traveling direction (direction indicated by the arrow FWD). Also, the mudguard members 18 are substantially S-shaped in cross section as shown in FIG. 8 and comprise a front baffle portion 18c provided on the front of the mudguard members 18 and a rear baffle portion 18d provided rearwardly of the front baffle portion 18c and formed to be contiguous to the front baffle portion 18c. The front baffle portions 18c are formed to extend in a direction substantially along a direction (direction indicated by an arrow D) in which the outer wall portion 15a extends straight, as viewed in plan view, and function to lead air entering the baffle device 15 smoothly rearward. Also, the rear baffle portion 18d is provided rearwardly of the front baffle portion 18c to project toward the inner wall portion 15c (direction indicated by the arrow A) and formed so that the front surface 13u (see FIG. 3) of the radiator 13c (see FIG. 3) is not seen as viewed from the front (direction indicated by the arrow FWD). Also, the rear baffle portion 18d is formed integral with and contiguous to the front baffle portion 18c. Also, the rear end 18e of the rear baffle portion 18d is formed to extend substantially perpendicular (direction indicated by the arrow FWD) to the front surface 13u (see FIG. 3) of the radiator 13b (see FIG. 3) as viewed in plan view and functions to make air flow in a direction substantially perpendicular to the front surface 13u (see FIG. 3) of the radiator 13b (see FIG. 3). Thereby, air entering the core portion 13a (see FIG. 3) of the radiator 13c (see FIG. 3) can be made to efficiently pass rearward, so that it is possible to improve the radiator 13c (see FIG. 3) in cooling efficiency.

Also, according to the first embodiment, as shown in FIGS. 1 and 3, a side cover 21 is arranged laterally (direction indicated by the arrow B) of the outer wall portion 14a in a manner to cover a central portion and a rear portion of the outer wall portion 14a laterally (direction indicated by the arrow B) thereof. The side cover 21 is fixed to the main frame 3 by screws (not shown). Also, as shown in FIG. 3, an outermost end 14o of the outer wall portion 14a is arranged inwardly of an outermost end 21a of the side cover 21 in a width direction (direction indicated by the arrow A and the arrow B). In addition, the outermost end 14o is an example of the term "outermost portion of the outer wall portion" used throughout the present disclosure. Also, the front end 14e of the outer wall portion 14a is arranged to extend forwardly (direction indicated by the arrow FWD) of a front end 21b of the side cover 21. Thereby, air having a large velocity of flow, flowing in the vicinity of the outer wall portion 14a, and not blocked in flow by the front fork 5, etc. can be taken into the baffle device 14.

Also, according to the first embodiment, as shown in FIGS. 1 and 3, a side cover 22 is arranged laterally (direction indicated by the arrow A) of the outer wall portion 15a in a manner to cover a central portion and a rear portion of the outer wall portion 15a laterally (direction indicated by the arrow A) thereof. The side cover 22 is fixed to the main frame 3 by screws (not shown). Also, as shown in FIG. 3, an outermost end 15o of the outer wall portion 15a is arranged inwardly of an outermost end 22a of the side cover 22 in a width direction (direction indicated by the arrow A and the arrow B). In addition, the outermost end 15o is an example of the term "outermost portion of the outer wall portion" used throughout the present disclosure. Also, the front end 15e of the outer wall portion 15a is arranged to extend forwardly (direction indicated by the arrow FWD) of a front end 22b of the side cover 22. Thereby, air having a large velocity of flow, flowing in the vicinity of the outer wall portion 15a, and not blocked in flow by the front fork 5, etc. can be taken into the baffle device 15.

Also, a pivot shaft 3c is provided on the upper frame portion 3a as shown in FIG. 1. The pivot shaft 3c supports a front end of a rear arm 23 to enable the same to swing vertically. A rear wheel 24 is mounted rotatably to a rear end of the rear arm 23. That is, the rear wheel 24 is mounted to the main frame 3 through the rear arm 23.

Figure 10:
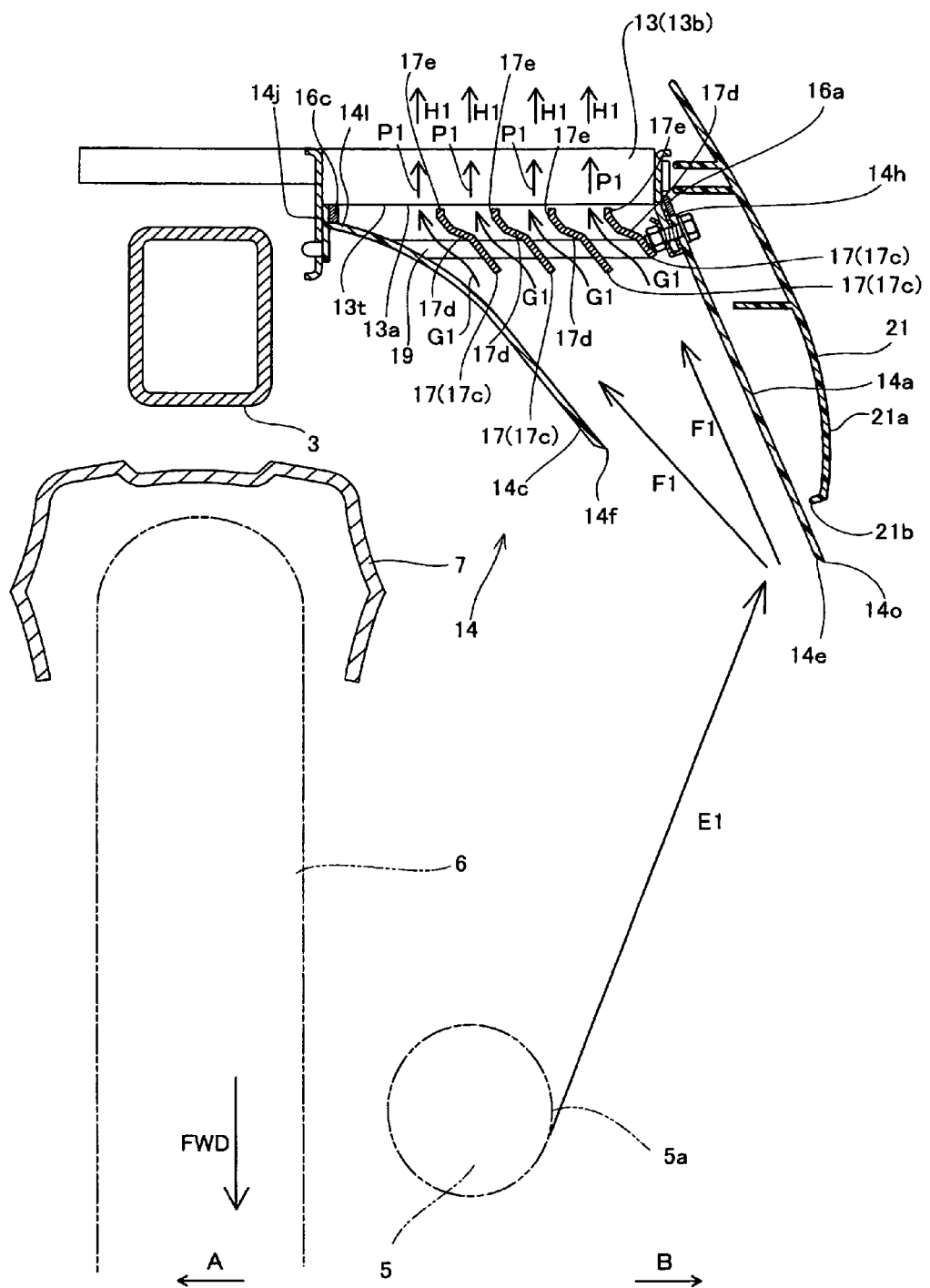
FIG. 10 is a plan view showing the flow of air led to the radiator on the right of the motorcycle as viewed from the front, according to the first embodiment, shown in FIG. 1.
Figure 11:
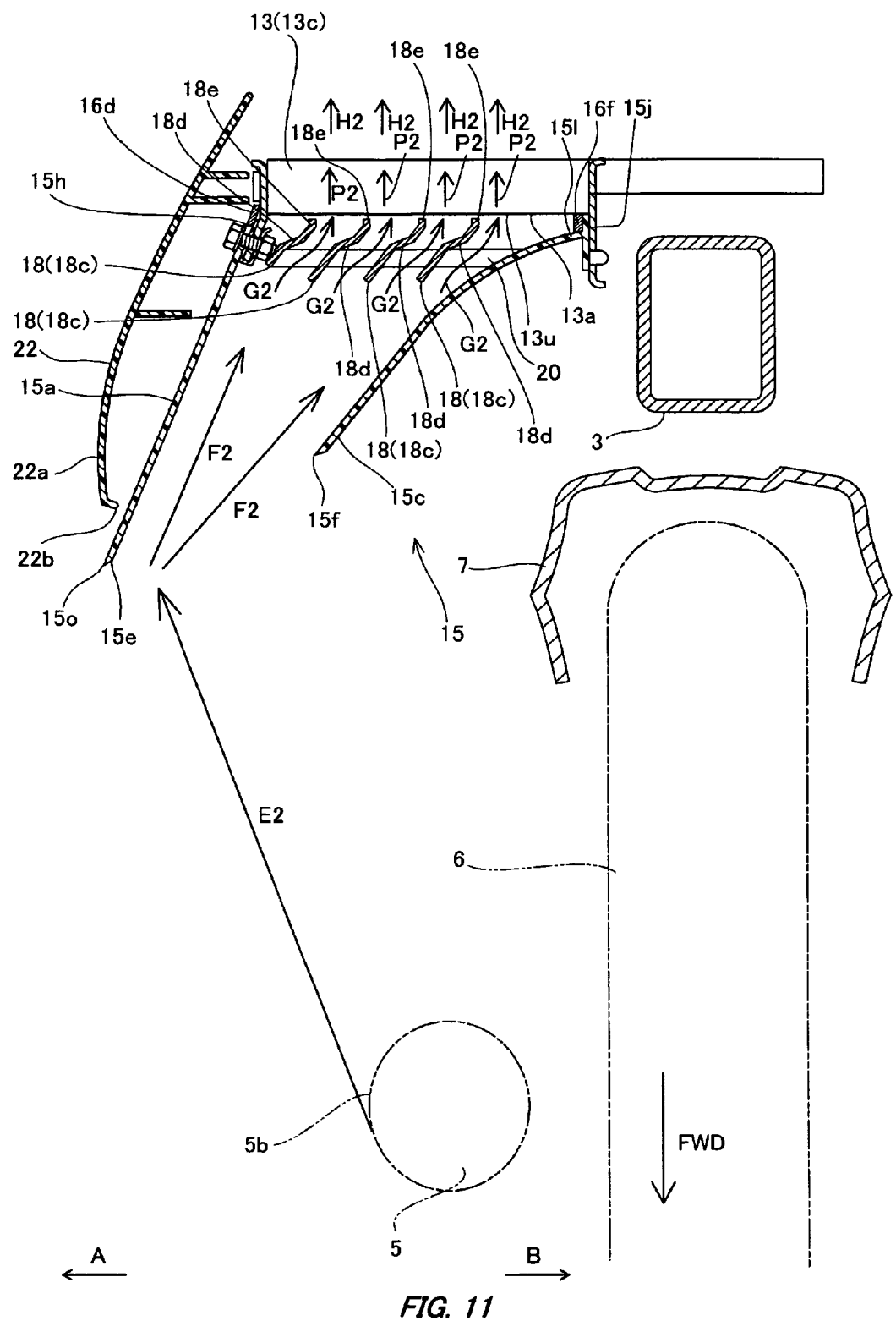
FIG. 11 is a plan view showing the flow of air led to the radiator on the left of the motorcycle as viewed from the front, according to the first embodiment, shown in FIG. 11.

FIGS. 10 and 11, are plan views showing air flow through the baffle device and the radiator of the motorcycle, according to the first embodiment, shown in FIG. 1. More particularly, referring to FIGS. 1, 2 and FIGS. 9 to 11, an explanation will now be given to how air is led to the radiator 13 through the baffle device 14 and the baffle device 15 when the motorcycle 1 travels in the direction indicated by the arrow FWD.

First, an explanation will be given to how air is led to the radiator 13b through the baffle device 14. As shown in FIG. 10, when the motorcycle 1 (see FIG. 1) travels in the direction indicated by the arrow FWD air having a large velocity will flow laterally of the outermost portion of the left shock absorber 5a of the front fork 5 in a direction indicated by arrow E1. Subsequently, air flowing in the direction indicated by the arrow E1 will strike against the outer wall portion 14a in the area of its front end 14e and enter into the baffle device 14. At this time, air flowing in the direction indicated by the arrow E1 will flow along the shape of the baffle device 14 in a direction indicated by arrows F1.

Thereafter, air flowing in the direction indicated by the arrows F1 enters the mudguard members 17 from the front baffle portions 17c and flows along the rear baffle portions 17d in a direction indicated by arrows G1. The front baffle portions 17c are preferably formed to extend in a direction substantially along that direction in which the outer wall portion 14a extends, so that air flowing along the outer wall portion 14a can enter the mudguard members 17 smoothly. Also, since the rear end 17e of each rear baffle portion 17d, which are formed contiguous to their respective front baffle portion 17c, is formed substantially perpendicular to the front surface 13t of the radiator 13b, air flowing in the direction indicated by the arrows G1 can be made substantially perpendicular to the front surface 13t of the radiator 13b. Thereby, air flowing in the direction indicated by the arrows G1 and entering the core portion 13a of the radiator 13b can be efficiently passed rearward (direction indicated by the arrows P1), so that it is possible to improve the radiator 13b in cooling efficiency.

Thereafter, air having passed through the core portion 13a of the radiator 13b in the direction indicated by the arrows P1 flows rearwardly (direction indicated by the arrows H1) of the motorcycle 1.

An explanation will now be given to how air is led to the radiator 13c through the baffle device 15. As shown in FIG. 11, when the motorcycle 1 (see FIG. 1) travels in the direction indicated by the arrow FWD air having a large velocity will flow laterally of the outermost portion of right shock absorber 5b of the front fork 5 in a direction indicated by arrow E2. Subsequently, air flowing in the direction indicated by the arrow E2 will strike against the outer wall portion 15a in the area of its front end 15e and enter into the baffle device 15. At this time, air flowing in the direction indicated by the arrow E2 will flow along the shape of the baffle device 15 in a direction indicated by arrows F2.

Thereafter, air flowing in the direction indicated by the arrows F2 enters the mudguard members 18 from the front baffle portions 18c and flows along the rear baffle portions 18d in a direction indicated by arrows G2. The front baffle portions 18c are preferably formed to extend in a direction substantially along that direction in which the outer wall portion 15a extends, so that air flowing along the outer wall portion 15a can enter the mudguard members 18 smoothly. Also, since the rear end 18e of each rear baffle portion 18d, which are formed contiguous to their front baffle portion 18c, is formed substantially perpendicular to the front surface 13u of the radiator 13c, air flowing in the direction indicated by the arrows G2 can be made substantially perpendicular to the front surface 13u of the radiator 13c. Thereby, air flowing in the direction indicated by the arrows G2 and entering the core portion 13a of the radiator 13c can be efficiently passed rearward (direction indicated by arrows P2), so that it is possible to improve the radiator 13c in cooling efficiency.

Thereafter, air having passed through the core portion 13a of the radiator 13c in the direction indicated by the arrows P2 flows rearwardly (direction indicated by the arrows H2) of the motorcycle 1.

According to the first embodiment, as described above, by providing the baffle device 14 (15) including the outer wall portion 14a (15a) extending from the outer side 13l (13n) of the radiator 13b (13c) at an included obtuse angle to the front surface 13t (13u) of the radiator 13b (13c), the upper wall portion 14b (15b) extending from the upper portion 13d (13f) of the radiator 13b (13c) at an obtuse angle and arranged through the sealing member 16b (16e) in a manner not to have any substantial gap between it and the upper portion of the radiator 13b (13c), and the inner wall portion 14c (15c) extending from the inner side 13e (13g) of the radiator 13b (13c) at an included acute angle to the front surface 13t (13u) of the radiator 13b (13c), air received from the front by the baffle device 14 (15) and led toward the front surface 13t (13u) of the radiator 13b (13c) can be inhibited from passing at least between the upper wall portion 14b (15b) of the baffle device 14 (15) and the upper portion 13d (13f) of the radiator 13b (13c), so that a further large quantity of an air can be made to enter the core portion 13a of the radiator 13b (13c) as compared with the case where a gap is provided between the upper wall portion 14b (15b) and the upper portion 13d (13f)

of the radiator 13b (13c). Thereby, the radiator 13b (13c) can be improved in cooling efficiency.

Also, according to the first embodiment, a region surrounded by the outer wall portion 14a (15a), the upper wall portion 14b (15b), and the inner wall portion 14c (15c) of the baffle device 14 (15) is opened downward to provide the opening 14d (15d), whereby in the case where mud, etc. are splashed from the front during travel enters the region surrounded by the outer wall portion 14a (15a), the upper wall portion 14b (15b), and the inner wall portion 14c (15c) of the baffle device 14 (15), it is possible to inhibit the mud, etc. from accumulating in the region surrounded by the outer wall portion 14a (15a), the upper wall portion 14b (15b), and the inner wall portion 14c (15c) since the mud, etc. can be discharged below the region surrounded by the outer wall portion 14a (15a), the upper wall portion 14b (15b), and the inner wall portion 14c (15c). The above effect is particularly useful in a motorcycle 1 of offroad specifications since mud, etc. are liable to enter the baffle device 14 (15).

Also, according to the first embodiment, by providing the plurality of mudguard members 17 (18) in the form of a vane in a region surrounded by the outer wall portion 14a (15a), the upper wall portion 14b (15b), and the inner wall portion 14c (15c) of the baffle device 14 (15), it is possible to inhibit mud, etc. from striking against the front surface 13t (13u) of the radiator 13b (13c) in the case where mud, etc. are splashed from the front. As a result, it is possible to inhibit mud, etc. from adhering to the front surface 13t (13u) of the radiator 13b (13c). Thereby, it is possible to inhibit the radiator 13b (13c) from being decreased in cooling efficiency.

Also, according to the first embodiment, by connecting the plurality of mudguard members 17 (18) together by the mudguard plate 19 (20) arranged in the vicinity of the lower portion of the front surface 13t (13u) of the radiator 13b (13c) and having a mudguard function, mud, etc. can be readily inhibited by the mudguard plate 19 (20) from striking against the front surface 13t (13u) of the radiator 13b (13c) in the case where mud, etc. are splashed from below the motorcycle.

FIGS. 12 to 23 illustrate in detail, a construction of a motorcycle according to a second embodiment. Referring to FIGS. 12 to 23, an explanation of the second embodiment will now be given. The second embodiment is different from the first embodiment in that outer wall portions of baffle devices 150, 160, respectively, comprise side covers 121, 122.

Figure 12:
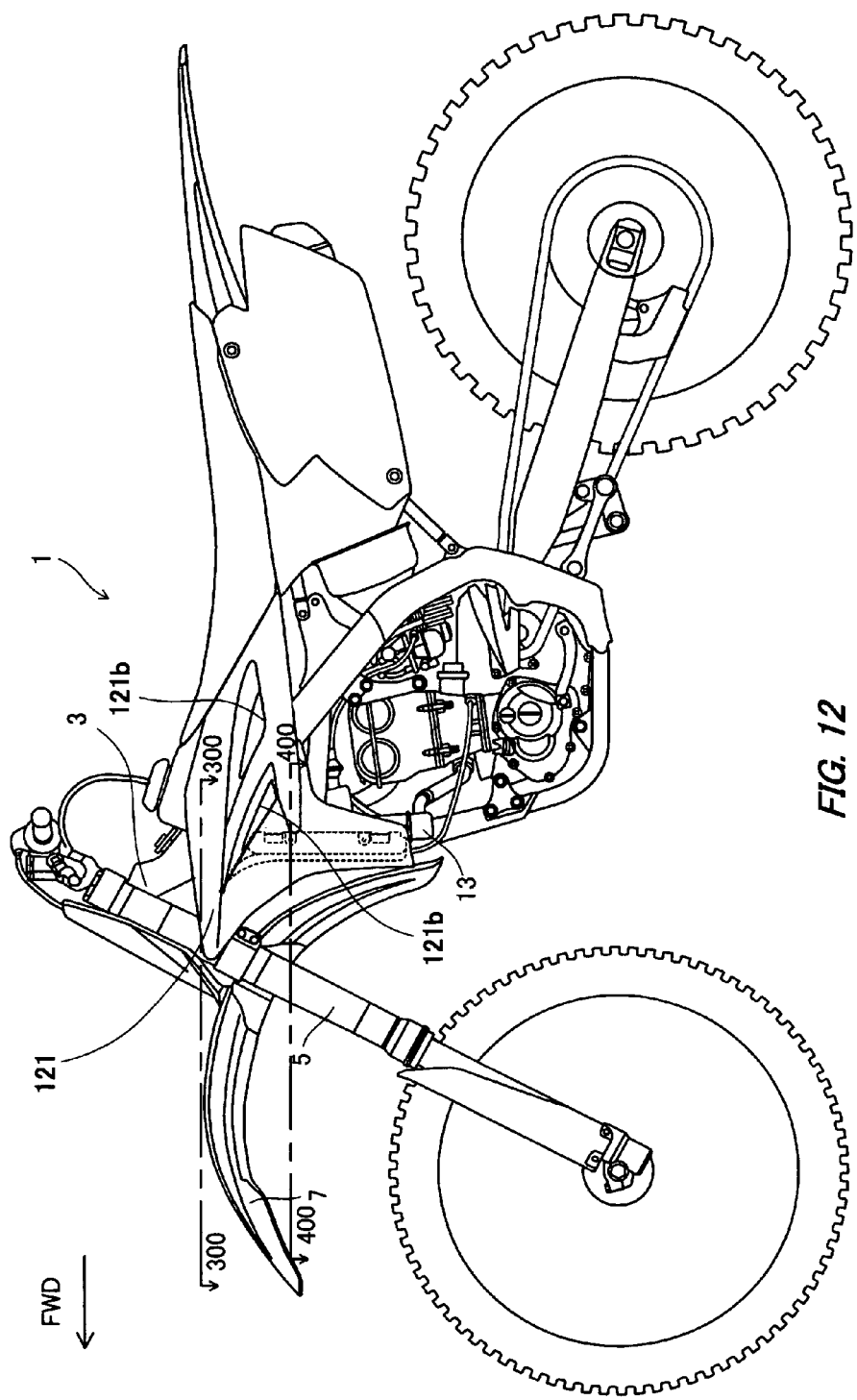
FIG. 12 is a side view showing a motorcycle according to a second embodiment of the invention.
Figure 13:
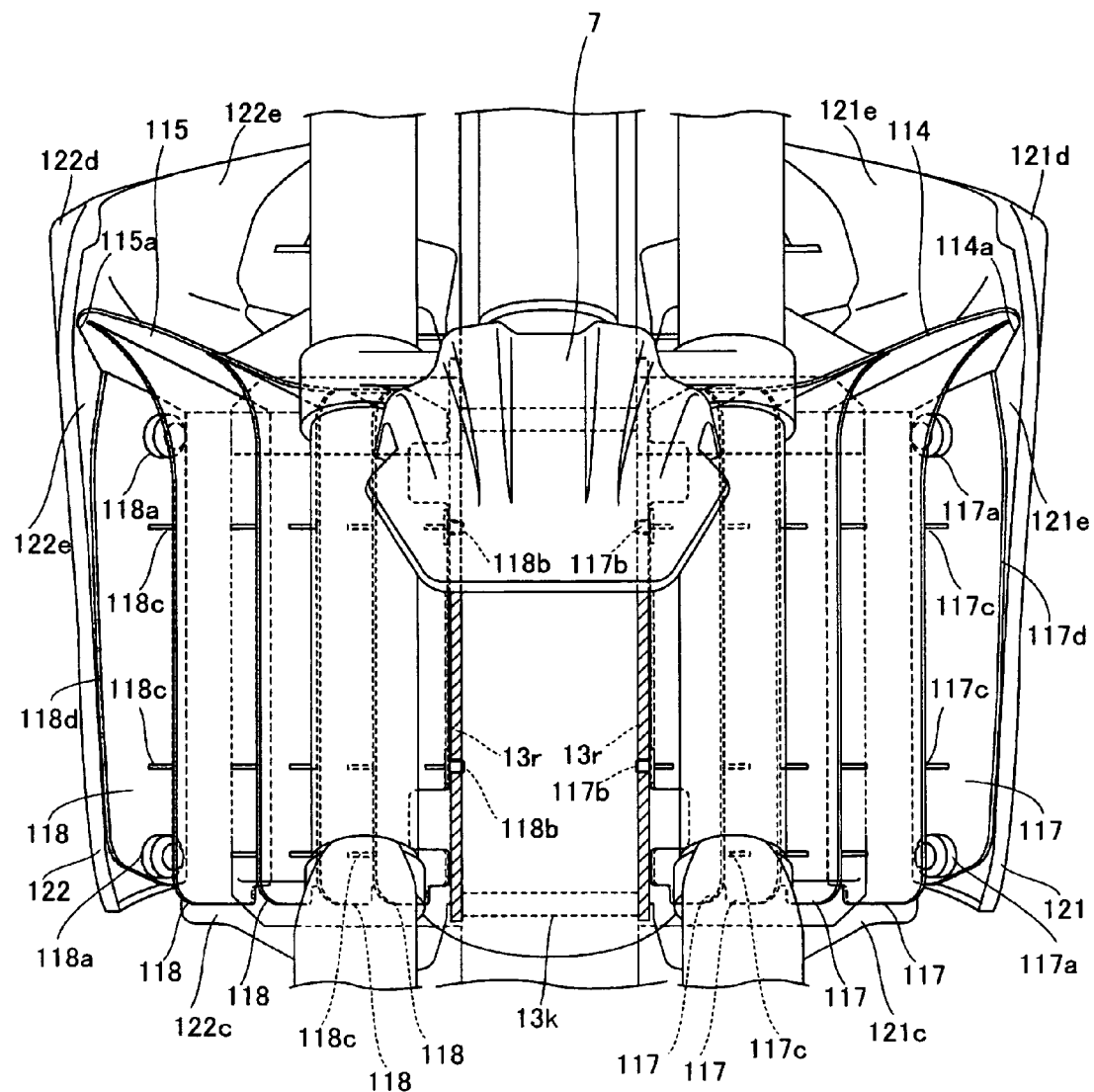
FIG. 13 is a front view illustrating a construction around the radiator of the motorcycle, according to the second embodiment, shown in FIG. 12.

According to the second embodiment, as shown in FIGS. 12 and 13, the baffle devices 150, 160, respectively, are made of a resin and are mounted to a pair of radiators 13. The baffle devices 150, 160 have bilateral symmetry with respect to a center of the vehicle as viewed from the front of the vehicle. First, an explanation will be given to the baffle device 150 on the right as viewed from the front of the vehicle.

Here, according to the second embodiment, as shown in FIGS. 12 to 16, the baffle device 150 comprises the outer wall portion composed of the side cover 121, and an upper wall portion 114. The side cover 121, which constitutes the outer wall portion of the baffle device 150, includes two inwardly projecting screw insertion portions 121a. The side cover 121 is fixed to mudguard members 117 by inserting a pair of screws 200 into the inwardly projecting screw insertion portions 121a to screw the same into nuts 201 embedded in the nut embedded portions 117a (see FIG. 15) included in an outermost mudguard member 117 described later.

Also, as shown in FIGS. 12 to 14 and FIG. 16, the side cover 121, which constitutes the outer wall portion of the baffle device 150, is formed to diverge outward in a vehicle width direction. Two openings 121b are provided on a side of the side cover 121. Further, as shown in FIG. 13, a lower end 121c of the side cover 121 is formed to extend downwardly to a level near the lower ends of the mudguard members 117.

Figure 14:
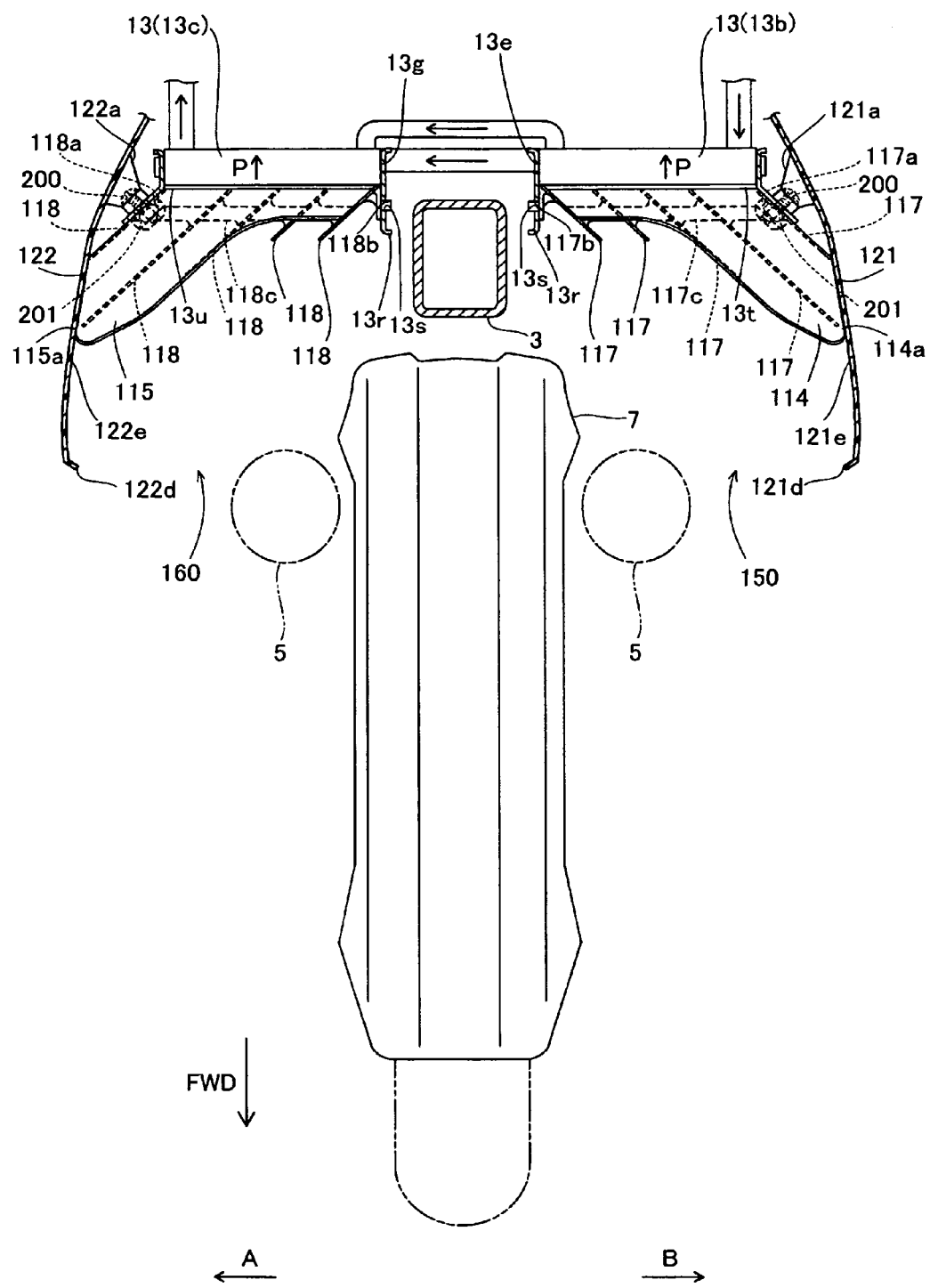
FIG. 14 is a cross sectional view taken along the line 300-300 in FIG. 12 illustrating the construction around the radiator of the motorcycle, according to the second embodiment, shown in FIG. 12.
Figure 15:
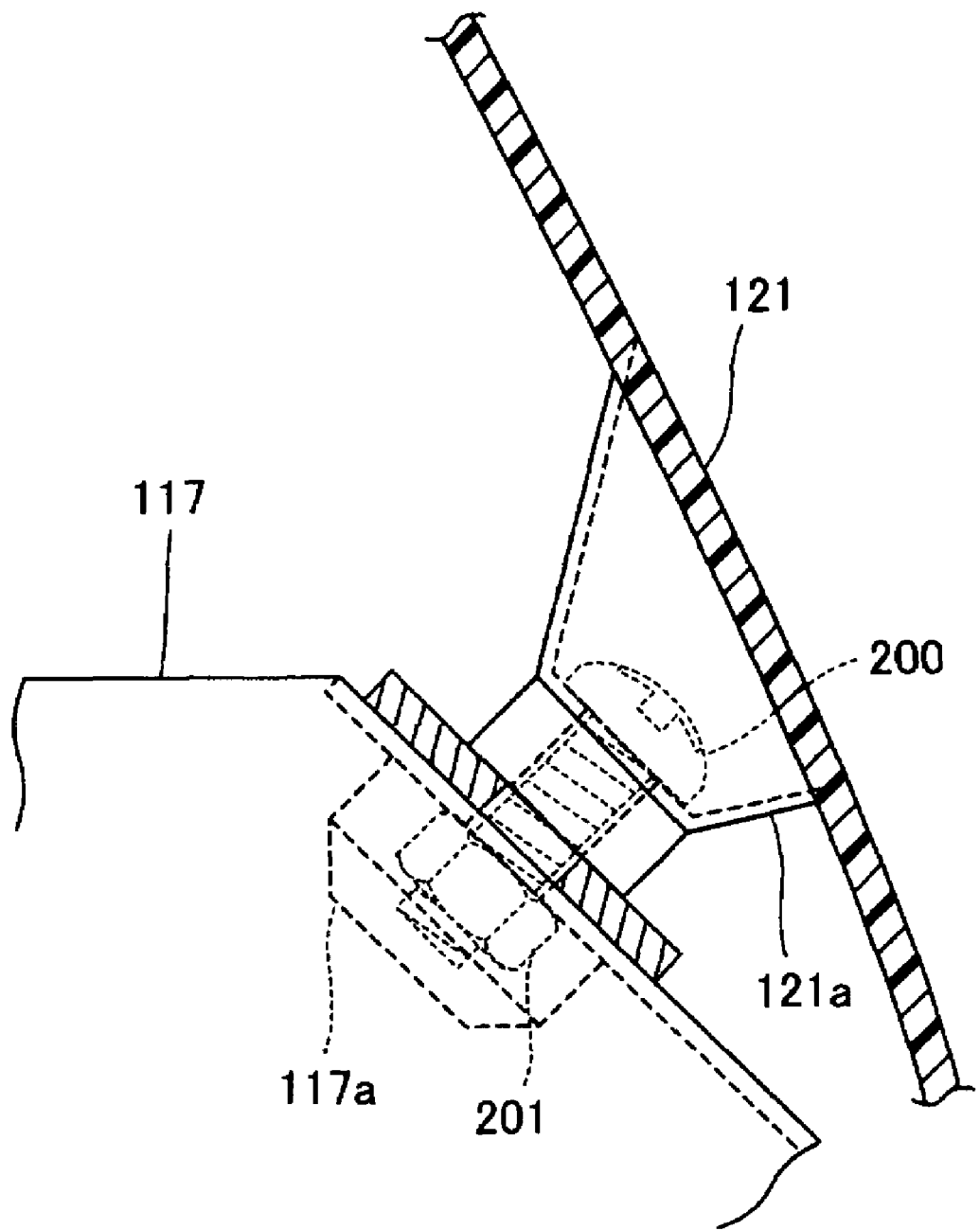
FIG. 15 is a partially enlarged view showing a portion, to which a side cover of the motorcycle, according to the second embodiment, shown in FIG. 14 is mounted.

Also, as shown in FIGS. 12 and 14, a front end 121d of the side cover 121 is formed to extend forward so that at least a portion of the side cover 121 extends as far forward as the front shock 5 when viewed from the side and so that the front end 121d is positioned outward of the front fork 5 when viewed from the front of the vehicle. That is, the side cover 121 is structured so that air having a large velocity of flow and passing on the side of the front fork 5 toward the arrow B can be led toward the mudguard members 117, without being blocked by the front fork 5.

Figure 16:
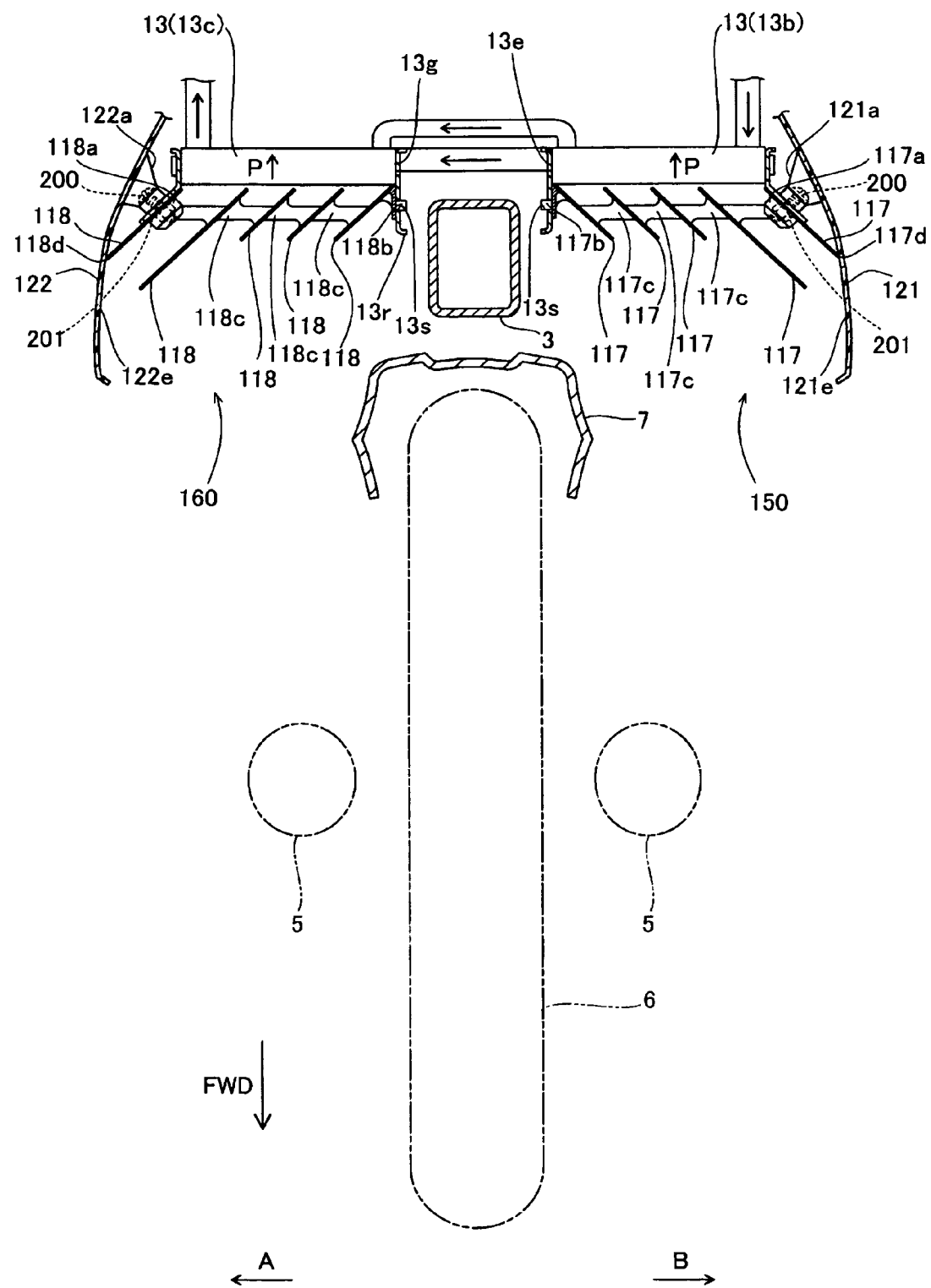
FIG. 16 is a cross sectional view taken along the line 400-400 in FIG. 12 illustrating the construction around the radiator of the motorcycle, according to the second embodiment, shown in FIG. 12.
Figure 20:
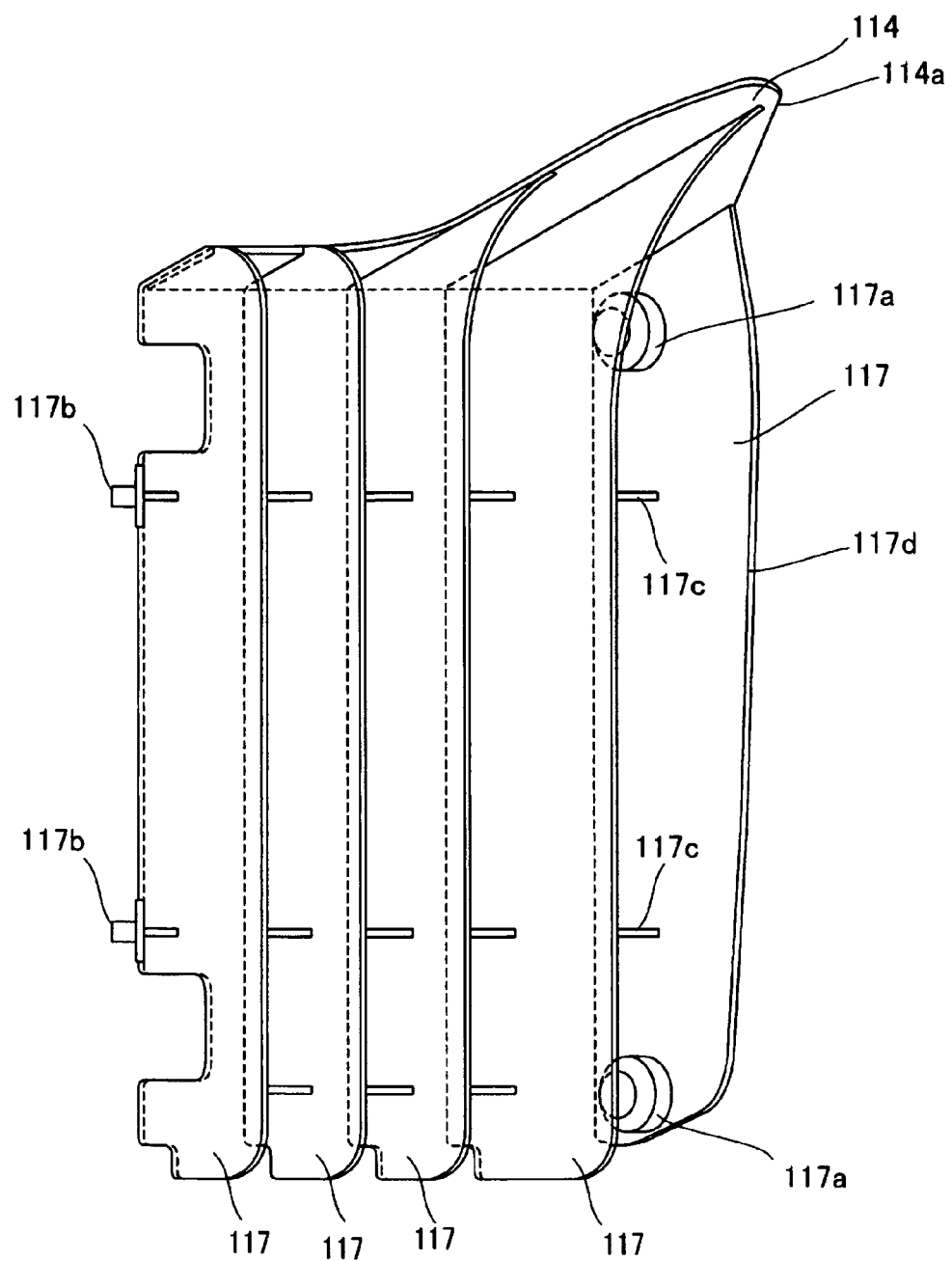
FIG. 20 is a front view illustrating the construction of the upper wall portion and the mudguard members on the right of the motorcycle as viewed from the front, according to the second embodiment, shown in FIG. 12.

In addition, according to the second embodiment, as shown in FIGS. 13, 14, and 16, the mudguard members 117 are fixed to an inner side 13e of the radiator 13b. Specifically, an innermost mudguard member 117 includes two boss portions 117b which are inserted in the two boss insertion holes 13s on the radiator inner side 13e. Also, as shown in FIGS. 13 and 20, the plurality of mudguard members 117 are connected to connection members 117c to be fixed relative to one another. The mudguard members 117 serve to inhibit mud, etc. splashed from the front from striking against the radiator 13 and have a baffle function for the radiator 13.

Also, as shown in FIGS. 13, 14, and 16, no gap is provided between an inner surface portion 121e of the side cover 121 and an outer edge 114a of the upper wall portion 114. Further, no gap is provided between the side cover inner surface portion 121e and an outer edge 117d of the outermost mudguard member 117.

Here, according to the second embodiment, the upper wall portion 114 and the mudguard members 117 are formed integral with each other. Therefore, no gap is provided between the upper wall portion 114 and the mudguard members 117.

Also, as shown in FIG. 13, the mudguard members 117 are arranged so that front surface 13t (see FIG. 14) of the radiator 13b is not seen as viewed from the front (direction indicated by the arrow FWD). Specifically, the plurality of mudguard members 117 are mounted to the radiator 13b to have a predetermined angle to the traveling direction (direction indicated by the arrow FWD). Also, as shown in FIGS. 19 to 21, the second mudguard member 117 from the outside is provided to extend the farthest forward among the plurality of mudguard members 117.

Figure 19:
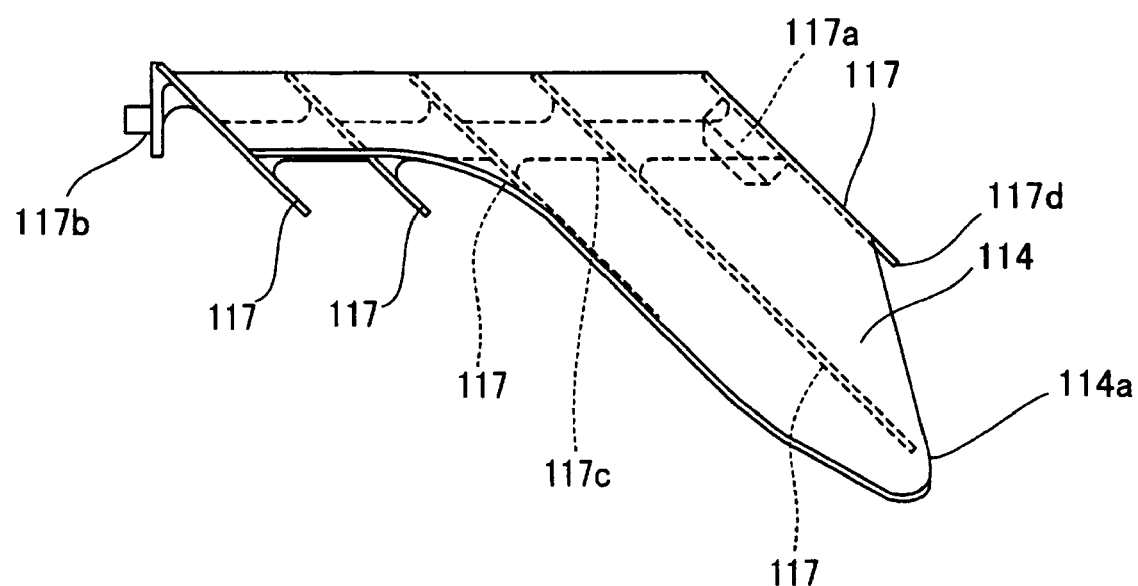
FIG. 19 is a plan view illustrating a construction of an upper wall portion and mudguard members on the right of the motorcycle as viewed from the front, according to the second embodiment, shown in FIG. 12.
Figure 21:
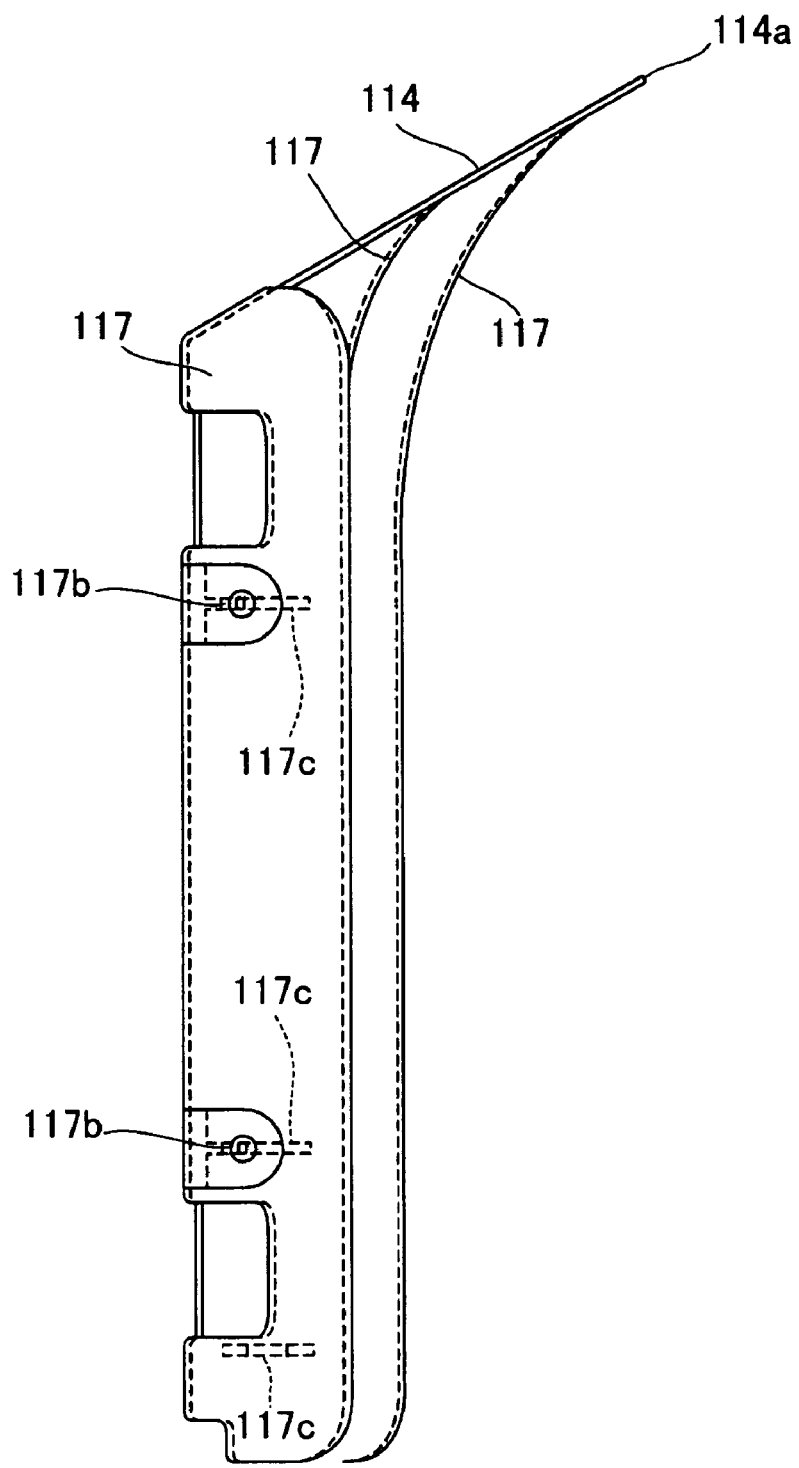
FIG. 21 is a side view illustrating the construction of the upper wall portion and the mudguard members on the right of the motorcycle as viewed from the front, according to the second embodiment, shown in FIG. 12.

Also, as shown in FIGS. 19 to 21, the upper wall portion 114 is formed to extend forward and obliquely upward. Further, upper portions of the mudguard members 117 formed integral with the upper wall portion 114 are formed to extend forward and obliquely upward. Also, as viewed in plan view, an outer portion (portion toward the side cover 121) of the upper wall portion 114 is formed to extend forwardly of an inner portion thereof. Thereby, it is possible to further intake air along the inner surface portion 121e of the side cover 121.

Figure 17:
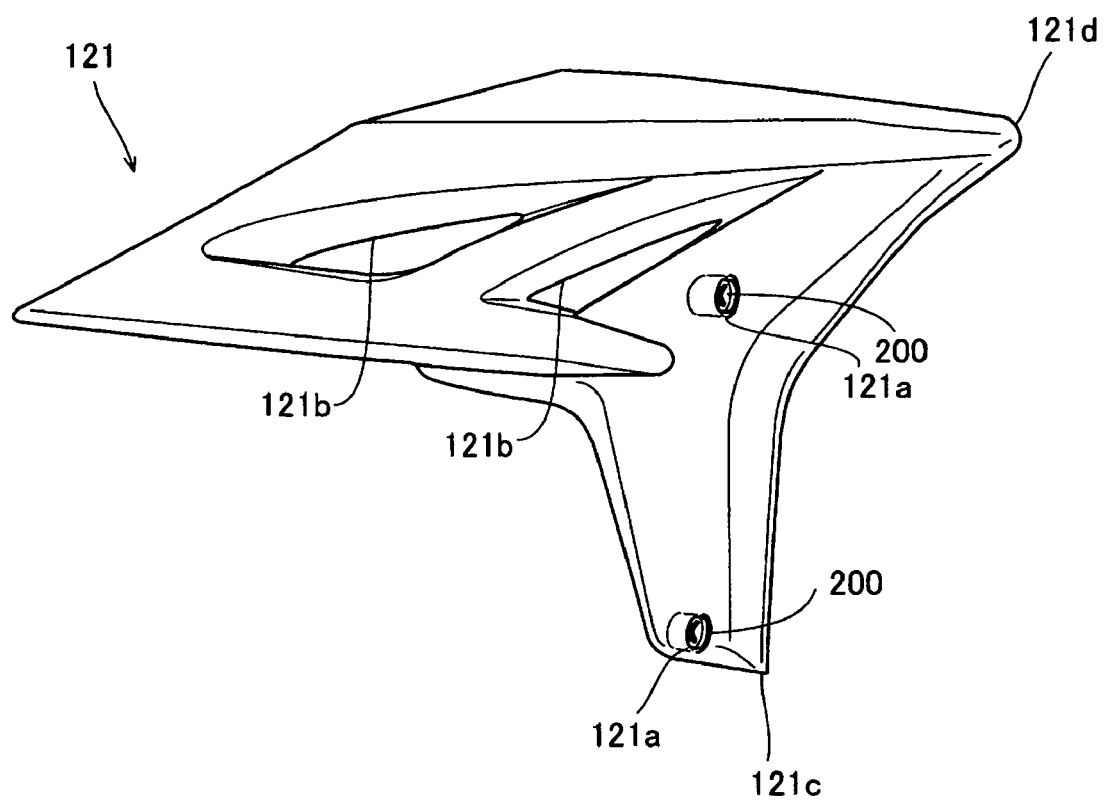
FIG. 17 is a side view illustrating a construction of a side cover on the right of the motorcycle as viewed from the front, according to the second embodiment, shown in FIG. 12.
Figure 18:
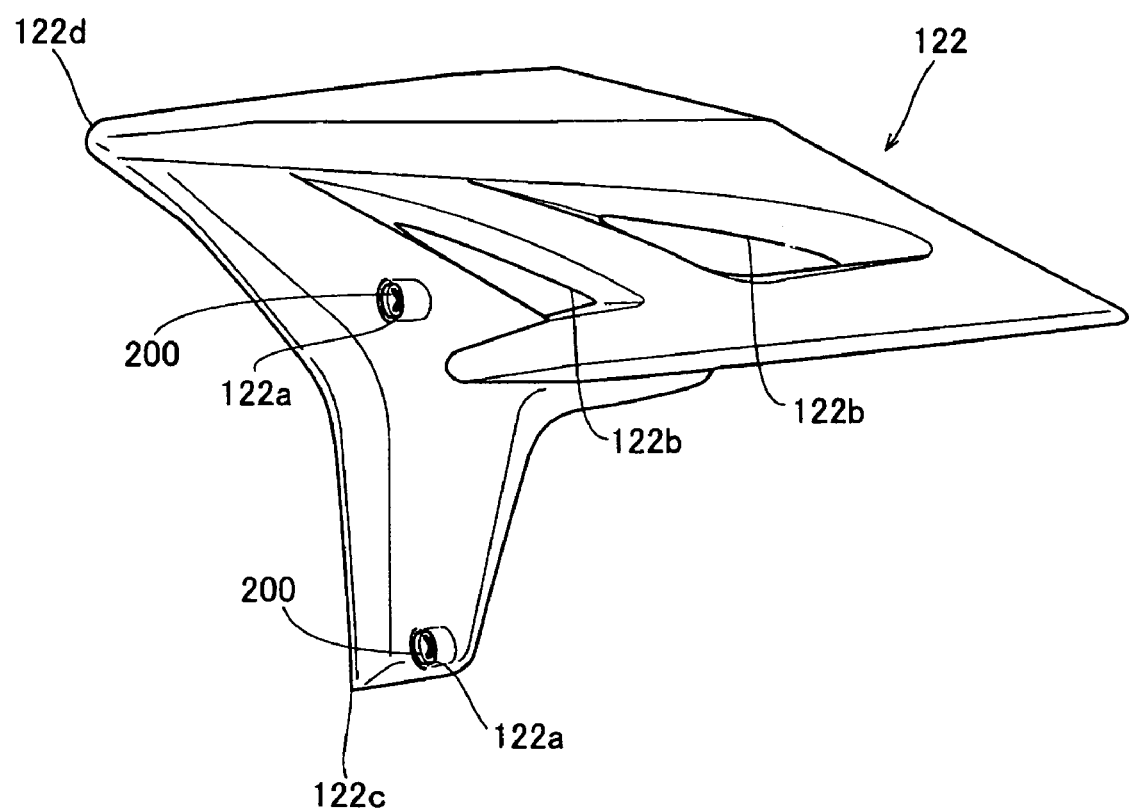
FIG. 18 is a side view illustrating a construction of a side cover on the left of the motorcycle as viewed from the front, according to the second embodiment, shown in FIG. 12.

An explanation will now be given of the baffle device 160 on the left as viewed from the front of the vehicle. The baffle device 160 comprises the side cover 122 and an upper wall portion 115. Also, as shown in FIGS. 12 to 14 and FIGS. 16 to 18, the side cover 122 is in bilateral symmetry with respect to the side cover 121 as described above, and as shown in FIGS. 12 to 14 and FIG. 16, an outer wall portion of the baffle device 160 comprises the side cover 122. The side cover 122, which constitutes the outer wall portion, includes two screw insertion portions 122a. The side cover 122 is fixed to mudguard members 118 by inserting a pair of screws 200 into the screw insertion portions 122a to screw the same into nuts 201 embedded in nut embedded portions 118a (see FIG. 15) included in an outermost mudguard member 118 described later.

Here, according to the second embodiment, as shown in FIGS. 12 to 16, the baffle device 160 comprises the outer wall portion composed of the side cover 122, and an upper wall portion 115. The side cover 122, which constitutes the outer wall portion of the baffle device 160, includes two inwardly projecting screw insertion portions 122a. The side cover 122 is fixed to mudguard members 118 by inserting two screws 200 into the screw insertion portions 122a to screw the same into the nuts 201 embedded in the nut embedded portions 118a (see FIG. 15) included in the outermost mudguard member 118 described later.

Also, as shown in FIGS. 12 to 14 and FIG. 16, the side cover 122, which constitutes the outer wall portion of the baffle device 160, is formed to diverge outward in the vehicle width direction. Two openings 122b are provided on a side of the side cover 122. Further, as shown in FIG. 13, a lower end 122c of the side cover 122 is formed to extend downwardly to a level near the lower level ends of the mudguard members 118.

Also, as shown in FIGS. 12 and 14, a front end 122d of the side cover 122 is formed to extend forward so that at least a portion of the side cover 122 extends as far forward as the front shock 5 when viewed from the side and so that the front end 122d is positioned outward of the front fork 5 when viewed from the front of the vehicle. That is, the side cover 122 is structured so that air having a large velocity of flow and passing on the side of the front fork 5 toward the arrow B can be led toward the mudguard members 118 without being blocked by the front fork 5.

Figure 23:
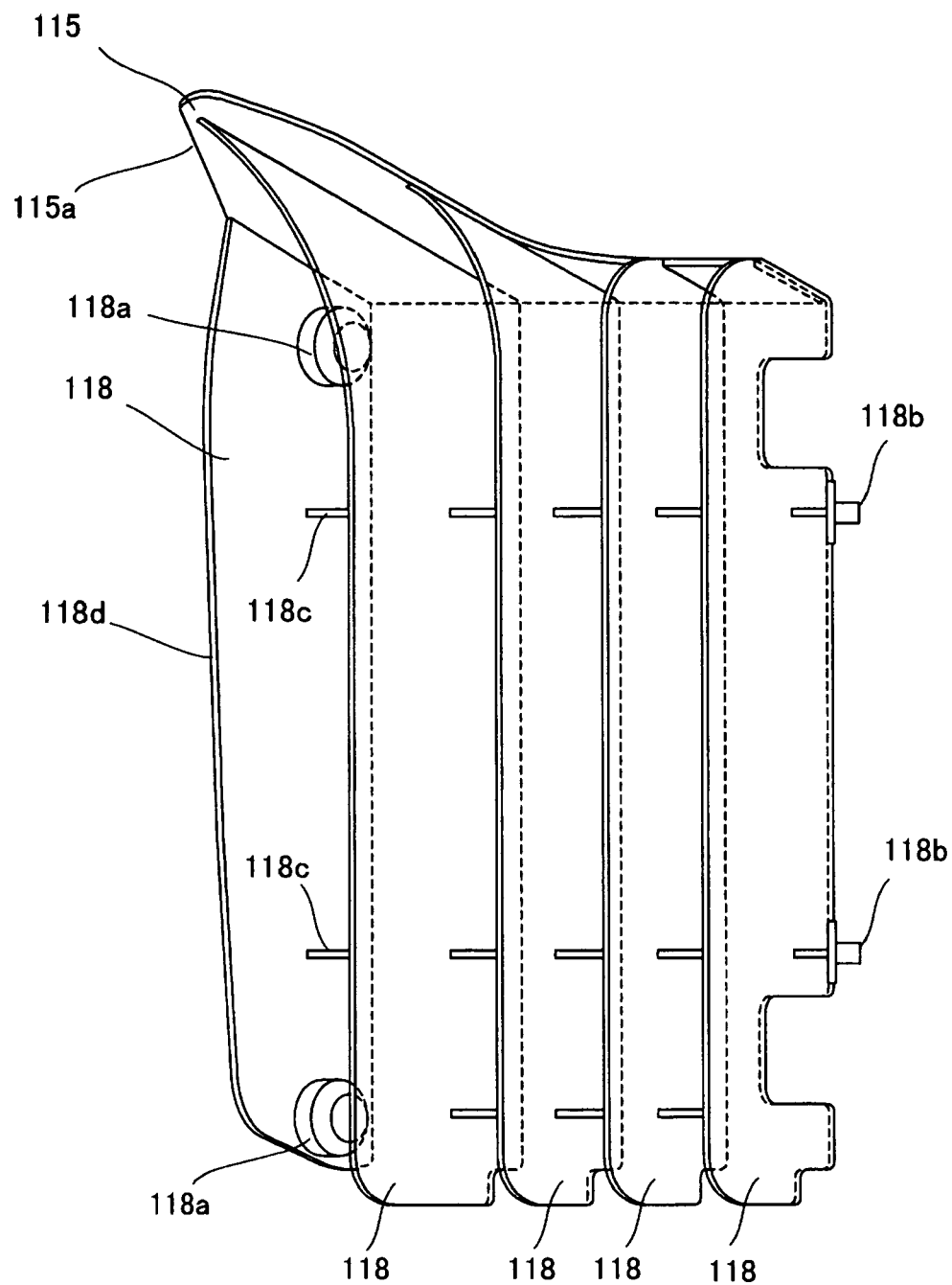
FIG. 23 is a front view illustrating the construction of the upper wall portion and the mudguard members on the left of the motorcycle as viewed from the front, according to the second embodiment, shown in FIG. 12.

In addition, according to the second embodiment, as shown in FIGS. 13, 14, and 16, the mudguard members 118 are fixed to an inner side 13g of the radiator 13c. Specifically, an innermost mudguard member 118 includes two boss portions 118b which are inserted in the two boss insertion holes 13s on the radiator inner side 13g. Also, as shown in FIGS. 13 and 23, the plurality of mudguard members 118 are connected to connection members 118c to be fixed relative to one another. The mudguard members 118 serve to inhibit mud, etc. splashed from the front from striking against the radiator 13 and have a baffle function for the radiator 13.

Also, as shown in FIGS. 13, 14, and 16, no gap is provided between an inner surface portion 122e of the side cover 122 and an outer edge 115a of the upper wall portion 115. Further, no gap is provided between the side cover inner surface portion 122d and an outer edge 118d of the outermost mudguard member 118.

Here, according to the second embodiment, the upper wall portion 115 and the mudguard members 118 are formed integral with each other. Therefore, no gap is provided between the upper wall portion 115 and the mudguard members 118.

Also, as shown in FIG. 13, the mudguard members 118 are arranged so that front surface 13u (see FIG. 14) of the radiator 13c is not seen as viewed from the front (direction indicated by the arrow FWD). Specifically, the plurality of mudguard members 117 are mounted to the radiator 13c to have a predetermined angle to the traveling direction (direction indicated by the arrow FWD). Also, as shown in FIGS. 22 to 24, the second mudguard member 118 from the outside is provided to extend the furthest forward among the plurality of mudguard members 118.

Figure 22:
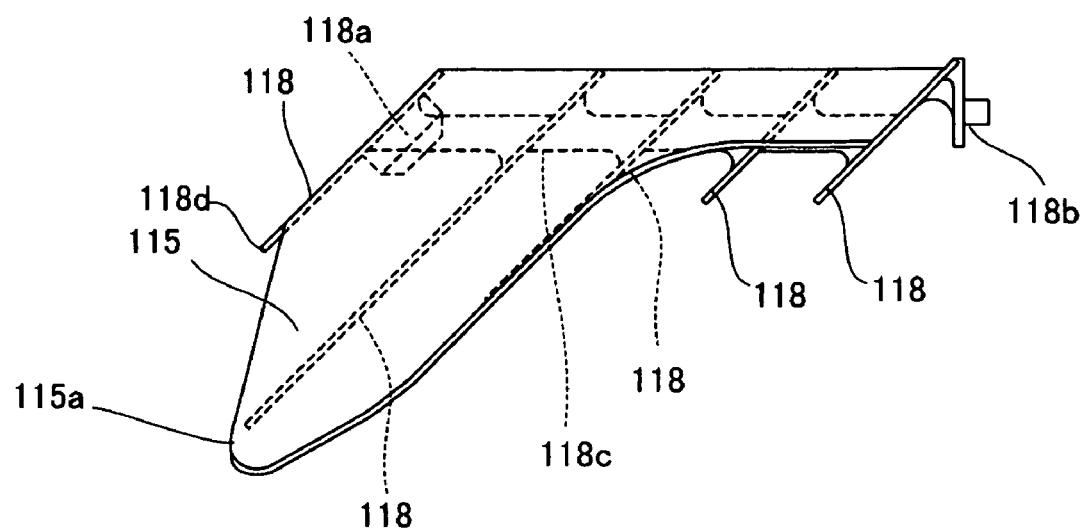
FIG. 22 is a plan view illustrating a construction of an upper wall portion and mudguard members on the left of the motorcycle as viewed from the front, according to the second embodiment, shown in FIG. 12.
Figure 24:
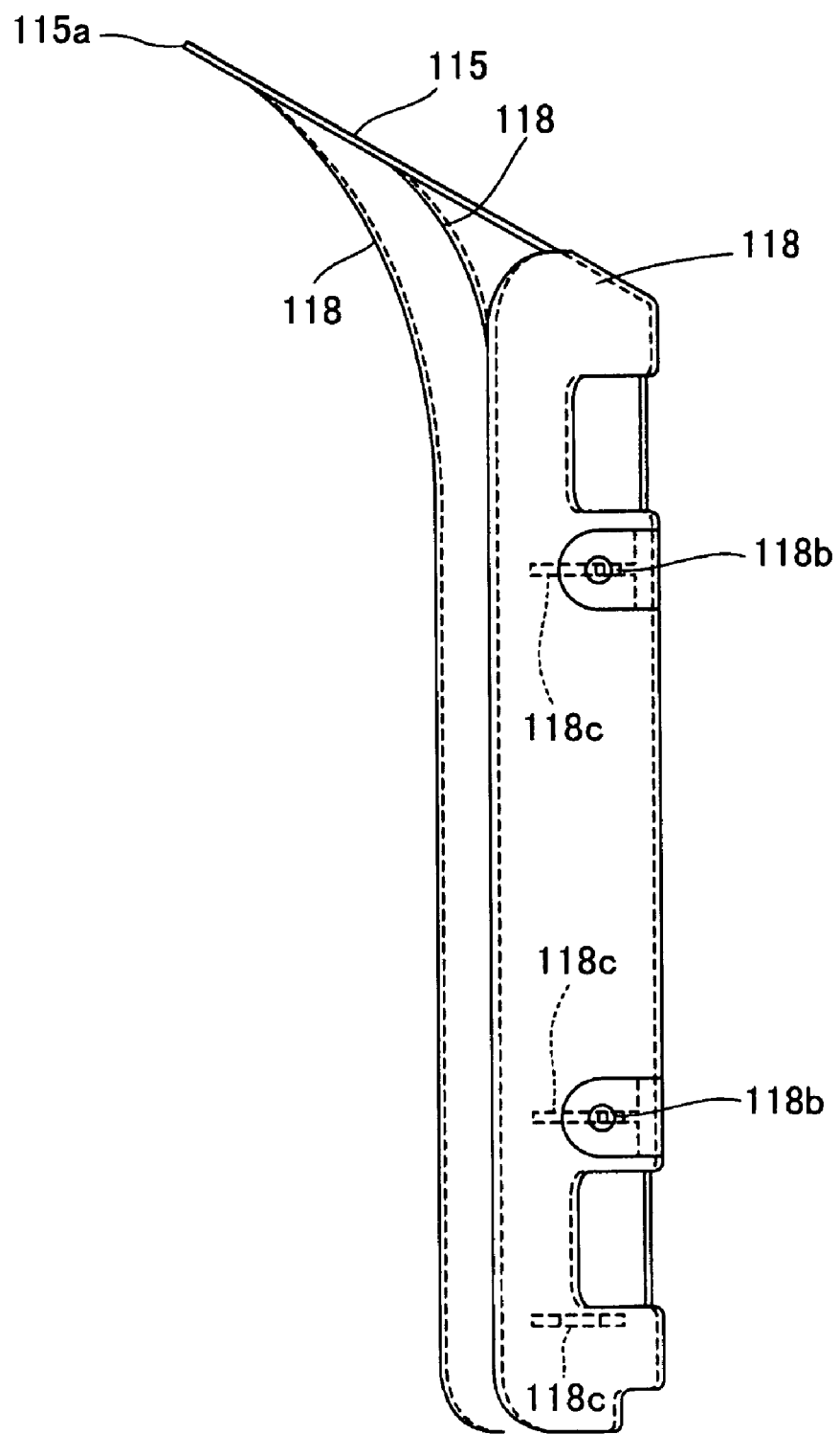
FIG. 24 is a side view illustrating the construction of the upper wall portion and the mudguard members on the left of the motorcycle as viewed from the front, according to the second embodiment, shown in FIG. 12.

Also, as shown in FIGS. 22 to 24, the upper wall portion 115 is formed to extend forward and obliquely upward. Further, upper portions of the mudguard members 118 formed integral with the upper wall portion 115 are formed to extend forward and obliquely upward. Also, as viewed in plan view, an outer portion (portion toward the side cover 122) of the upper wall portion 115 is formed to extend forwardly of an inner portion thereof. Thereby, it is possible to further intake along the inner surface portion 122e of the side cover 122.

According to the second embodiment, a baffle effect equivalent to that of the first embodiment can be produced since air having a large velocity of flow, passing outside the front fork 5, and not blocked in flow by the front fork 5, can be taken into the baffle device 150 (160) by the provision of the side cover 121 (122), which constitutes the outer wall portion as described above in the first embodiment. Also, by not providing the outer wall portion and the side cover separately from each other, the number of parts can be decreased as compared with the first embodiment, so that a vehicle body can be made more lightweight.

Also, because the upper wall portion 114 (115) and the mudguard members 117 (118) are formed integrally, the number of parts can be decreased as compared with the case where they are provided separately from each other. Consequently, a vehicle body can be made more lightweight as compared with the first embodiment. Also, being made integral with the upper wall portion 114 (115), the mudguard members 117 (118) can be improved in mechanical strength.

Also, according to the second embodiment, since no gap is provided between the inner surface portion 121d (122d) of the side cover 121 (122) and the outer edge 117d (118d) of the outermost mudguard member 117 (118), air received by the side cover 121 (122) in the traveling direction (direction indicated by the arrow FWD) and led toward the radiator front surface 13t (13u) can be inhibited from passing outside the radiator 13b (13c) through a gap between the side cover inner surface portion 121e (122e) and the outer edge 117d (118d) of the outermost mudguard member 117. Consequently, a further large quantity of an air can be led by the core portion 13a of the radiator.

The embodiments disclosed herein are exemplary in all respects and not limitative. The scope of the invention is indicated not by the descriptions of the embodiments but the claims, and all changes, which come within the meaning and range of equivalence of the claims are embraced therein.

For example, while the embodiments show a motorcycle of offroad specifications as an example of a vehicle provided with a radiator, the invention is not limited thereto but is also applicable to other vehicles of offroad specifications, such as three-wheelers, ATVs (All Terrain Vehicles) etc, provided that the vehicles of offroad specifications comprise a radiator.

Also, while the first embodiment shows an example, in which the baffle device is provided so that gaps are not provided between the outer wall portion, the upper wall portion, and the inner wall portion of the baffle device, and the radiator, the invention is not limited thereto. For example, in other embodiments, the baffle device may be provided so that a gap is not provided either between the outer wall portion, the upper wall portion, or the inner wall portion of the baffle device and the radiator.

Also, while the first embodiment shows an example, in which the region surrounded by the outer wall portion, the upper wall portion, and the inner wall portion is opened downward to provide the opening, the invention is not limited thereto. For example, in other embodiments, a lower wall portion may be provided below the region surrounded by the outer wall portion, the upper wall portion, and the inner wall portion and an opening may be provided on the lower wall portion.

Also, while the first embodiment shows an example, in which the outermost end of the outer wall portion is arranged inwardly of the outermost end of the side cover in the width direction, the invention is not limited thereto. For example, in other embodiments, the outermost end of the outer wall portion may be arranged outwardly of the outermost end of the side cover.

Also, while the second embodiment shows an example, in which an inner wall portion, which constitutes the baffle device, is not provided, the invention is not limited thereto. For example, in other embodiments, an inner wall portion may be provided inwardly of the innermost mudguard member in the second embodiment, which constitutes the baffle device.

What is claimed is:

1. A vehicle, comprising:
   an engine;
   a radiator including one side end and an other side end, which are spaced from each other in a vehicle width direction, and a core portion through which a cooling water for cooling of the engine passes, the core portion being disposed between the one side end and the other side end; and
   a baffle device including an outer wall portion extending toward the one side end of the radiator from the front and an upper wall portion extending toward an upper end of the radiator from the front, the upper wall portion opposing the upper end of the radiator in the entire length between the one side end and the other side end of the radiator and arranged in a manner not to have a substantial gap between the upper wall portion and the upper end of the radiator.

2. The vehicle according to claim 1, wherein the outer wall portion comprises a side cover.

3. The vehicle according to claim 2, further comprising a front wheel and a front fork supporting the front wheel, and
   wherein a front end of the side cover is formed to extend forward to the vicinity of the front fork.

4. The vehicle according to claim 2, wherein an inner surface of the side cover and an outer edge portion of the upper wall portion of the baffle device are arranged so as to substantially have no gap therebetween.

5. The vehicle according to claim 1, further comprising a front wheel and a front fork supporting the front wheel, and
   wherein a front end of the outer wall portion is arranged outwardly of an outermost portion of the front fork as viewed from the front.

6. The vehicle according to claim 1, wherein the baffle device further includes an inner wall portion extending toward the other side end of the radiator from the front.

7. The vehicle according to claim 6, wherein a region surrounded by the outer wall portion, the upper wall portion, and the inner wall portion of the baffle device is opened downward.

8. The vehicle according to claim 1, further comprising a plurality of mudguard members in the form of a vane arranged in a region surrounded by the outer wall portion and the upper wall portion of the baffle device.

9. The vehicle according to claim 8, wherein the upper wall portion of the baffle device is formed integral with the mudguard members.

10. The vehicle according to claim 8, wherein the outer wall portion of the baffle device comprises a side cover, and
    an inner surface of the side cover and an outer edge portion of an outermost mudguard member are arranged so as to substantially have no gap therebetween.

11. The vehicle according to claim 8, wherein the plurality of mudguard members are arranged so that a front surface of the radiator cannot be seen through the mudguard members when viewed from the front.

12. The vehicle according to claim 8, further comprising an inner wall portion extending toward the other side end of the radiator from the front, and
    wherein the mudguard members have a baffle function, and each mudguard member integrally comprises a front baffle portion substantially extending in a direction in which the outer wall portion extends, as viewed in a plan view, and a rear baffle portion contiguous to the front baffle portion and provided rearwardly of the front baffle portion, the rear baffle portion being formed to project toward the inner wall portion a sufficient distance so that a front surface of the radiator cannot be seen through mudguard member when viewed from the front.

13. The vehicle according to claim 12, wherein a rear end portion of the rear baffle portion of each mudguard member is provided to extend substantially perpendicular to the front surface of the radiator as viewed in plan view.

14. A vehicle, comprising:
    an engine;
    a radiator including one side end and an other side end, which are spaced from each other in a vehicle width direction, and a core portion through which a cooling water for cooling of the engine passes, the core portion being disposed between the one side end and the other side end;
    a baffle device including an outer wall portion extending toward the one side end of the radiator from the front and an upper wall portion extending toward an upper end of the radiator from the front, the upper wall portion arranged in a manner not to have a substantial gap between the upper wall portion and the upper end of the radiator; and
    a plurality of mudguard members in the form of a vane arranged in a region surrounded by the outer wall portion and the upper wall portion of the baffle device, wherein the plurality of mudguard members are connected together by a mudguard plate, which is arranged in the vicinity of a lower portion of a front surface of the radiator and has a mudguard function.

15. A vehicle, comprising:
    an engine;
    a radiator including one side end and an other side end, which are spaced from each other in a vehicle width direction, and a core portion through which a cooling water for cooling of the engine passes, the core portion being disposed between the one side end and the other side end;
    a baffle device including an outer wall portion extending toward the one side end of the radiator from the front and an upper wall portion extending toward an upper end of the radiator from the front, the upper wall portion arranged in a manner not to have a substantial gap between the upper wall portion and the upper end of the radiator;
    a plurality of mudguard members in the form of a vane arranged in a region surrounded by the outer wall portion and the upper wall portion of the baffle device; and
    an inner wall portion extending toward the other side end of the radiator from the front, wherein the mudguard members have a baffle function, and each mudguard member integrally comprises a front baffle portion substantially extending in a direction in which the outer wall portion extends, as viewed in a plan view, and a rear baffle portion contiguous to the front baffle portion and provided rearwardly of the front baffle portion, the rear baffle portion being formed to project toward the inner wall portion a sufficient distance so that a front surface of the radiator cannot be seen through a mudguard member when viewed from the front, wherein a sealing member is arranged at least between a rear end of the outer wall portion of the baffle device and the one side end of the radiator, between a rear end of the upper wall portion of the baffle device and the upper end of the radiator, and between a rear end of the inner wall portion of the baffle device and the other side end of the radiator.

16. The vehicle according to claim 6, wherein the outer wall portion, the upper wall portion, and the inner wall portion are formed integrally.

17. The vehicle according to claim 6, wherein a front end of the outer wall portion is positioned forward of a front end of the inner wall portion.

18. The vehicle according to claim 1, wherein the outer wall portion is formed to be in the form of a flat surface.

19. The vehicle according to claim 1, wherein the baffle device is mounted to the radiator.

20. A vehicle, comprising:
an engine;
a radiator including one side end and an other side end, which are spaced from each other in a vehicle width direction, and a core portion through which a cooling water for cooling of the engine passes, the core portion being disposed between the one side end and the other side end;
a baffle device including an outer wall portion extending toward the one side end of the radiator from the front and an upper wall portion extending toward an upper end of the radiator from the front, the upper wall portion arranged in a manner not to have a substantial gap between the upper wall portion and the upper end of the radiator; and
a side cover arranged in a manner to cover at least a part of a side of the outer wall portion, and wherein an outermost portion of the outer wall portion is arranged, as viewed from the front, inwardly of the outermost portion of the side cover and outwardly of a front end of the side cover.

21. The vehicle according to claim 1 comprising a motorcycle of offroad specifications.

22. The vehicle according to claim 1, wherein the outer wall portion and upper wall portion each form an obtuse angle with a front surface of the radiator.

23. The vehicle according to claim 22, wherein the baffle device further includes an inner wall portion extending toward the other side end of the radiator from the front, and wherein the inner wall portion forms an acute angle with the front surface of the radiator.

24. The vehicle according to claim 23, further comprising a front wheel and a front fork supporting the front wheel; and
wherein a front end of the outer wall portion and a front end of the inner wall portion are positioned outwardly of an outermost portion of the front fork as viewed from the front; and
the front end of the outer wall portion is formed to extend forward to the vicinity of the front fork.

25. The vehicle according to claim 5, wherein the baffle device further includes an inner wall portion extending toward the other side end of the radiator from the front, and wherein a front end of the outer wall portion and a front end of the inner wall portion are positioned outwardly of an outermost portion of the front fork as viewed from the front.

* * * * *